US012748530B2

(12) United States Patent
Basit et al.

(10) Patent No.: US 12,748,530 B2
(45) Date of Patent: Sep. 29, 2026

(54) DYNAMIC QUALITY OF SERVICE IMPLEMENTATION BASED UPON RESOURCE SATURATION

(71) Applicant: NetApp, Inc., San Jose, CA (US)

(72) Inventors: Abdul Basit, Morrisville, NC (US); Daniel McCarthy, Erie, CO (US); Christopher Lee Cason, Boulder, CO (US); Jian Hu, Apex, NC (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/935,813

(22) Filed: Nov. 4, 2024

(65) Prior Publication Data

US 2025/0060881 A1 Feb. 20, 2025

Related U.S. Application Data

(63) Continuation of application No. 18/307,097, filed on Apr. 26, 2023, now Pat. No. 12,135,880.

(51) Int. Cl.
*G06F 12/00* (2006.01)
*G06F 3/06* (2006.01)

(52) U.S. Cl.
CPC .......... *G06F 3/0613* (2013.01); *G06F 3/0659* (2013.01); *G06F 3/0683* (2013.01)

(58) Field of Classification Search
CPC ............................ G11C 14/0018; G06F 3/061
(Continued)

(56) References Cited

U.S. PATENT DOCUMENTS 7,418,531 B2 * 8/2008 Brewer ................. G06F 3/0631 710/36
7,594,044 B2 * 9/2009 Brewer ................... G06F 3/067 710/36

(Continued)

FOREIGN PATENT DOCUMENTS

EP 2798488 B1 10/2020

OTHER PUBLICATIONS

Teofilo L., "NetApp Storage QoS Tutorial", Flackbox, Retrieved on Feb. 6, 2023, 27 pages. Retrieved from Internet URL: https://www.flackbox.com/netapp-storage-qos-tutorial.

(Continued)

*Primary Examiner* — Mohamed M Gebril
(74) *Attorney, Agent, or Firm* — Cooper Legal Group, LLC

(57) ABSTRACT

Techniques are provided for dynamically implementing quality of service policies for a distributed storage system based upon resources saturation. A quality of service policy is defined for throttling I/O operations received by a node of the distributed storage system based upon whether resources of the node have become saturated. The quality of service policy is dynamically implemented based upon ever changing resource utilization and saturation. Dynamically implementing the quality of service policy improves the ability to efficiently utilize resources of the node compared to conventional static polices that cannot adequately react to such changing considerations and resource utilization/saturation. With conventional static policies, an administrator manually defines a minimum amount of guaranteed resources and/or a maximum resource usage cap that could be set to values that result in inefficient operation and resource starvation. Dynamically implementing the quality of service policy
(Continued)

results in more efficient operation and mitigates resource starvation.

20 Claims, 12 Drawing Sheets

(58) Field of Classification Search
USPC ........................................................ 711/105
See application file for complete search history.

(56) References Cited

U.S. PATENT DOCUMENTS

| | | | |
|---|---|---|---|
| 8,832,777 B2 | 9/2014 | Raleigh et al. | |
| 9,247,450 B2 | 1/2016 | Raleigh | |
| 9,413,611 B2 | 8/2016 | Chen et al. | |
| 9,436,391 B1 | 9/2016 | Lewis et al. | |
| 9,838,269 B2 | 12/2017 | Wright et al. | |
| 9,843,505 B2 | 12/2017 | Reddy et al. | |
| 10,257,098 B1 | 4/2019 | Banse et al. | |
| 10,439,900 B2 | 10/2019 | Wright et al. | |
| 11,005,924 B1 | 5/2021 | Cady et al. | |
| 11,153,225 B2 | 10/2021 | Lehane et al. | |
| 11,212,196 B2 | 12/2021 | Wright et al. | |
| 11,481,156 B1 | 10/2022 | Au et al. | |
| 11,627,097 B2 | 4/2023 | Longo et al. | |
| 12,126,502 B1 * | 10/2024 | Basit | G06F 3/0605 |
| 12,135,880 B1 | 11/2024 | Basit et al. | |
| 2013/0188483 A1 | 7/2013 | Teepell et al. | |
| 2018/0081832 A1 | 3/2018 | Longo et al. | |
| 2018/0275923 A1 | 9/2018 | Earhart et al. | |
| 2020/0137633 A1 * | 4/2020 | Torres | H04W 28/0289 |
| 2020/0278804 A1 * | 9/2020 | Guim Bernat | G06F 3/0637 |
| 2021/0181989 A1 | 6/2021 | Jung et al. | |
| 2021/0266358 A1 * | 8/2021 | Cady | H04L 67/1012 |
| 2022/0138223 A1 * | 5/2022 | Sonner | G06F 11/1471 707/620 |
| 2022/0147253 A1 * | 5/2022 | Sajeepa | G06F 3/065 |
| 2022/0156001 A1 | 5/2022 | Anandan et al. | |
| 2022/0182185 A1 * | 6/2022 | Bostrom | H04L 41/5009 |
| 2022/0413708 A1 | 12/2022 | Canepa | |
| 2022/0417175 A1 | 12/2022 | Lemberg et al. | |
| 2023/0153031 A1 | 5/2023 | Kang et al. | |
| 2023/0350570 A1 | 11/2023 | Bhatnagar et al. | |
| 2023/0401005 A1 | 12/2023 | Muthiah | |
| 2025/0047575 A1 | 2/2025 | Basit et al. | |
| 2025/0060881 A1 * | 2/2025 | Basit | G06F 3/0613 |

OTHER PUBLICATIONS

Mirvakili S.E., et al., "Managing Bufferbloat in Cloud Storage Systems," University of California, 2023, https://arxiv.org/pdf/2206.02906, 11 pages.

Netapp., "Design and Architecture Guide, Storage Configuration for Trident," 2021, 13 pages. Retrieved from Internet URL: https://netapp-trident.readthedocs.io/en/stable-v21.04/dag/kubernetes/index.html.

NetApp., "Guarantee throughput with QoS ONTAP 9," Feb. 3, 2023, 17 pages. Retrieved from Internet URL: https://docs.netapp.com/us-en/ontap/performance-admin/guaranteethroughput-qos-task.html.

NetApp., "Guarantee Throughput with QoS Overview," Feb. 6, 2023, 8 pages. Retrieved from Inernet URL: https://github.com/NetAppDocs/ontap/blob/main/performance-admin/guarantee-throughput-qos-task.adoc.

Netapp., "What is Adaptive QoS and how does it work?," Feb. 6, 2023, 5 pages. Retrieved from Internet URL: https://kb.netapp.com/Advice_and_Troubleshooting/%20Data_Storage_Software/ONTAP_OS/What_is_Ada.

Non Final Office Action mailed Feb. 7, 2024 for U.S. Appl. No. 18/307,103, filed Apr. 26, 2023, 09 pages.

Notice of Allowance mailed on Jul. 2, 2024 for U.S. Appl. No. 18/307,097, filed Apr. 26, 2023, 16 pages.

Notice of Allowance mailed on Jul. 10, 2024 for U.S. Appl. No. 18/307,097, filed Apr. 26, 2023, 12 pages.

Notice of Allowance mailed on Jul. 31, 2024 for U.S. Appl. No. 18/307,103, filed Apr. 26, 2023, 04 pages.

Notice of Allowance mailed on Jun. 20, 2024 for U.S. Appl. No. 18/307,103, filed Apr. 26, 2023, 08 pages.

Qu Z., et al., "Study QoS Optimization and Energy Saving Techniques in Cloud, Fog, Edge, and IoT," 2020: https://www.intel.com/content/dam/www/central-libraries/us/en/documents/distributed-storage-trends-white-paper, pp. 1-16.

Storage Quality of Service, 2022, Microsoft, https://learn.microsoft.com/en-us/windows-server/storage/storage-qos/storage-qos-overview, Mar. 29, 2022; 30 pages.

Non-Final Office Action mailed on Jun. 10, 2026 for U.S. Appl. No. 18/921,168, filed Oct. 21, 2024, 06 pages.

* cited by examiner

DYNAMIC QUALITY OF SERVICE IMPLEMENTATION BASED UPON RESOURCE SATURATION

RELATED APPLICATIONS

This application claims priority to U.S. patent application, titled "DYNAMIC QUALITY OF SERVICE IMPLEMENTATION BASED UPON RESOURCE SATURATION", filed on Apr. 26, 2023 and accorded application Ser. No. 18/307,097, which is incorporated herein by reference.

TECHNICAL FIELD

Various embodiments of the present technology relate to implementing quality of service policies. More specifically, some embodiments relate to dynamically implementing quality of service policies based upon resource saturation.

BACKGROUND

A distributed storage system provides a clustered environment that is scalable, elastic, and stateless. The distributed storage system includes nodes such as containers or virtual machines that can be created or deconstructed on-demand based upon ever changing storage needs of clients using the distributed storage system. Because resources of the distributed storage system are finite, quality of service policies need to be implemented to ensure that certain applications, volumes, clients, or services do not over consume resources, thus starving other applications, volumes, clients, or services.

Defining and implementing quality of service polices for the distributed storage system is challenging because all hardware, software, and capabilities of resources within the distributed storage system is too difficult to identify and track due to the dynamically scalable, elastic, stateless, and expansive nature of the distributed storage system. Defining effective quality of service policies for the distributed storage system that result in efficient and fair resource utilization is even more difficult when the distributed storage system is software defined where nodes are dynamically created or deconstructed on-demand as software such as containers, virtual machines, etc. Ineffective quality of service policies results in inefficient resource utilization, resource starvation, and performance degradation.

DESCRIPTION OF THE DRAWINGS

Embodiments of the present technology will be described and explained through the use of the accompanying drawings in which.

Figure 1A:
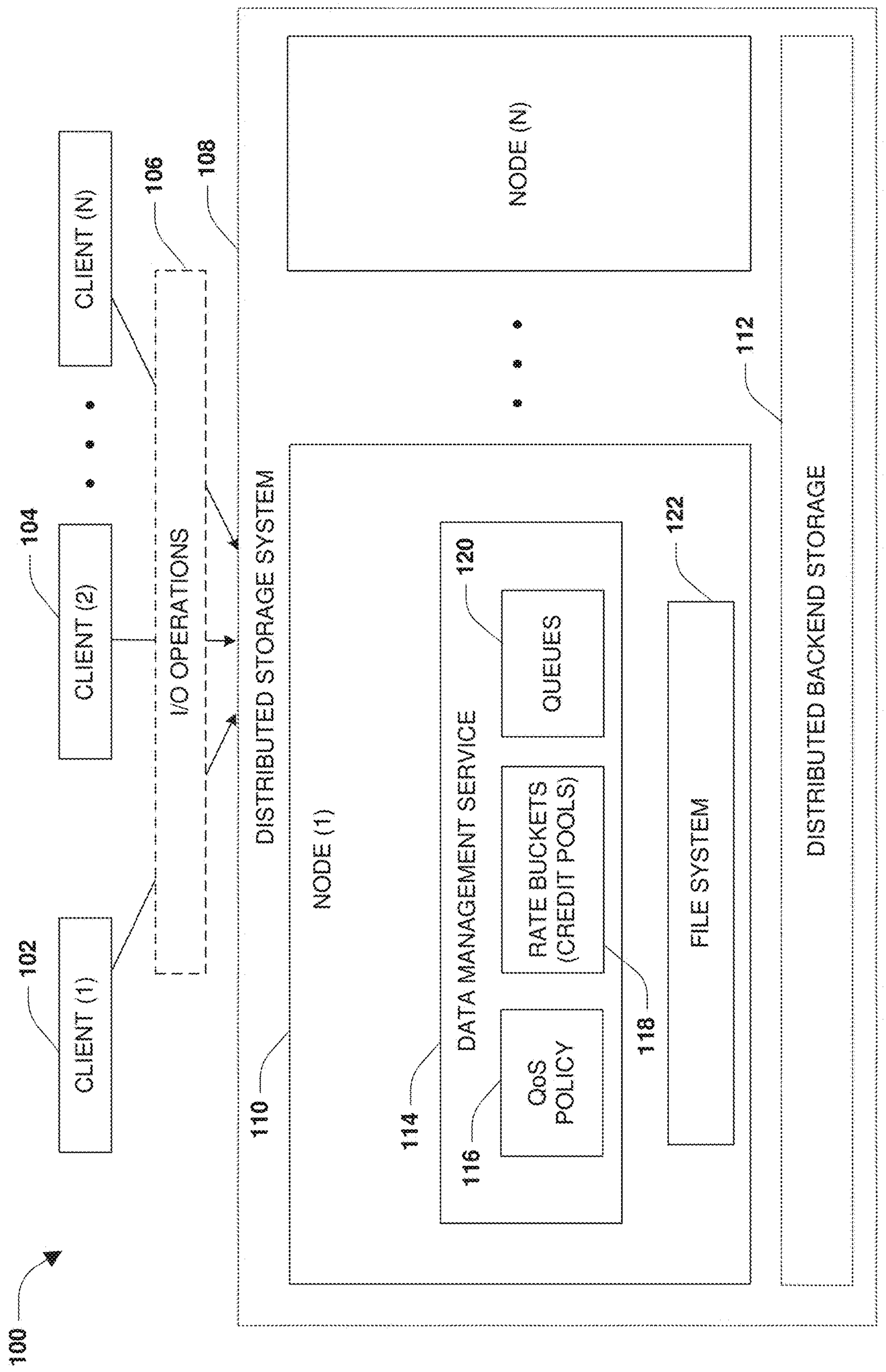
FIG. 1A is a block diagram illustrating an example of a distributed storage system where a quality of service policy is dynamically implemented in accordance with an embodiment of the present technology.

The drawings have not necessarily been drawn to scale. Similarly, some components and/or operations may be separated into different blocks or combined into a single block for the purposes of discussion of some embodiments of the present technology. Moreover, while the present technology is amenable to various modifications and alternative forms, specific embodiments have been shown by way of example in the drawings and are described in detail below. The intention, however, is not to limit the present technology to the particular embodiments described. On the contrary, the present technology is intended to cover all modifications, equivalents, and alternatives falling within the scope of the present technology as defined by the appended claims.

DETAILED DESCRIPTION

The techniques described herein are directed to improving quality of service enforcement for a distributed storage system by implementing dynamic quality of service policies based upon resource saturation. Previously, quality of service policies were defined and enforced as static policies. An administrator of a computing system defined a static quality of service policy by specifying various hard constraints on resources. The administrator set a minimum amount of a certain resource that will be guaranteed for a volume such as where the volume will be guaranteed at least 400 I/O per second (IOPS) throughput. If the computing system detects that the volume is not receiving at least the guaranteed minimum amount of the resource, then the computing system throttles I/O operations directed to other volumes or resources until the minimum amount guaranteed by the static quality of service policy is met. This minimum amount is set as a static quality of service policy value by the administrator.

Most times, the administrator will have little knowledge of how to correctly set quality of service policy values, such as a minimum IOPS value, that will result in fair and efficient resource management and allocation. Because of human error and guesswork involved with manually setting quality of service policy values, administrators usually set non-optimal values within quality of service policies due to guesswork by the administrator in guessing what values to specify.

As part of implementing a static quality of service policy, a company may purchase a storage appliance. The company sets a maximum resource usage cap (e.g., a cap/limit on IOPS or throughput) within the static quality of service policy for a volume so that the volume does not overly consume resources. When static maximum caps are set for resources, inefficient utilization of resources of the storage appliance can result. For example, a static quality of service policy is defined with a 25% resource usage limit for volumes. However, if the storage appliance only has one volume, then only 25% of resources will be utilized, which is an inefficient utilization of resources.

Creating quality of service policies that will result in fair and efficient resource utilization becomes more difficult with a distributed storage system that can be software defined, and is scalable, elastic, and stateless. The distributed storage system can dynamically scale up or down nodes and resources for meeting ever-shifting and unpredictable demands. Implementing quality of service policies for the distributed storage system is challenging because of the difficulty in identifying and taking into account the resources and capabilities of hardware dynamically spanning across which the distributed storage system. Also, the distributed storage system could be heavily cached. Reads from a cache will have a very different load/resource consumption profile than reads or writes that are further processed through the distributed storage system to distributed backend storage. It is difficult to identify and take into account these different load/resource consumption profiles when defining a quality of service policy.

In order to improve upon traditional quality of service policies, such as statically defined quality of service polices, the techniques provided herein provide for dynamically implementing quality of service polices that take into account resource saturation monitored in real-time. Instead of applying a static quality of service policy for an object of the distributed storage environment such as to ensure that a volume is receiving a minimum amount of guaranteed resources, the techniques provided herein dynamically implement a quality of service policy that focuses on whether resources such as processor resources have become saturated. If a resource is not saturated (e.g., processor utilization is below a 95% limit), then I/O operations are processed without any hindrance so that resources are fully/efficiently utilized. If the resource is saturated, then the quality of service policy is implemented to dynamically throttle I/O operations directed to the saturated resource. In particular, the quality of service policy is dynamically implemented such that I/O operations are throttled based upon dynamically changing minimum I/O processing rate recommendations derived from resource saturation that changes over time. I/O operations are throttled by queueing the I/O operations for subsequent execution instead of executing the I/O operations with any additional delay.

The dynamic quality of service policy provides a way to throttle I/O, prioritize certain objects, and monitor I/O operations for the objects. The objects may include volumes, logical unit numbers (LUNs), vservers, directories, files, slice services, file system services, etc. In some embodiments, the quality of service policy provides quality of service control for a maximum throughput limit that is dynamically configured and enforced as for an object. The quality of service policy provides priority bands used to dynamically configure and enforce I/O operation priority handling for objects. For example, larger proportions of I/O operations are processed for objects assigned higher priority bands than objects assigned to lower priority bands (e.g., medium priority band volumes are allocated twice as much IOPS as lower priority band volumes, and high priority band volumes are allocated twice as much IOPS as the medium priority band volumes). The quality of service policy provides write-only throttling to manage caches within the distributed storage system by throttling incoming I/O operations based upon load in order to protect distributed backend storage of the distributed storage system from becoming overloaded. Dynamic implementation of the quality of service includes the monitoring of storage operating system statistics that provide insight into I/O statistics on a workload basis, which is used to dynamically adapt the quality of service policy.

In some embodiments, the quality of service policy is created with a maximum IOPS limit, a burst IOPS limit, and priority bands. A quality of service priority scheduler implements the quality of service policy by scheduling certain proportions of I/O operations based upon the maximum IOPS limit, the burst IOPS limit, and the priority bands. For example, the quality of service priority scheduler schedules twice (or any other proportion) as many I/O operations for objects assigned to a medium priority band as objects assigned to a lower priority band. The quality of service priority scheduler schedules twice (or any other proportion) as many I/O operations for objects assigned to a high priority band as objects assigned to the medium priority band. The priority bands dictate I/O priority for scheduling, queuing, and throttling I/O operations directed to an object when resource saturation is detected (e.g., resource saturation where there is heavy processor utilization that could result in resource starvation). If there is no resource saturation, then the quality of service priority scheduler schedules all I/O operations without any queueing or throttling. The quality of service priority scheduler also takes into account the maximum IOPS limit (e.g., 400 IOPS during normal operation) and the burst IOPS limit (e.g., 450 IOPS when there is a burst of activity such as a I/O intensive workload being performed for a short period of time) so that I/O operations are queued and throttled when such limits are reached.

As part of implementing the quality of service policy, rate buckets are implemented. An object is assigned to a set of rate buckets, which is tracked by a mapping on a per object basis. The mapping specifies which rate buckets will be used to evaluate I/O operations directed to the object. An object can be assigned to a single rate bucket or multiple rate buckets that are each controlled by different throttling algorithms. For example, a rate bucket may relate to local resource utilization of a node. Another rate bucket may relate to processor usage of a data management service of the node (e.g., a data access layer local to the node). Yet another rate bucket may relate to a write cache of a storage management system (e.g., a storage layer distributed across nodes of the distributed storage system) to allow read operations but not write operations if the write cache becomes saturated. A rate bucket has one or more pools of credits consumed by I/O operations, such as a total pool of credits, a read pool of credits for read I/O operations, and a write pool of credits for write I/O operations.

When an I/O operation, targeting an object, is received by the data management service of the node, the I/O operation is evaluated using rate buckets mapped to the object. As part of a rate bucket processing the I/O operation, credits pools of the rate bucket are used to determine whether the rate bucket indicates that the I/O operation can be route to a file system for execution upon the object because there is no resource saturation, or the I/O operation should be queued as part of throttling and I/O shaping because there is resource saturation. Resource saturation is detected if there are not enough credits to process the I/O operation. The I/O operation must pass through all rate buckets mapped to the object (rate buckets indicating that the I/O operation can be routed to the file system) before the I/O operation is routed to the file system. Otherwise, the I/O operation is queued because at least one rate bucket indicated that there is resource saturation where there are not enough credits in a particular credit pool for the I/O operation.

As part of throttling I/O based upon resource saturation using the quality of service policy, multiple queues are implemented. In some embodiments, there is a queue for each priority band, such as a first queue for the low priority band, a second queue for the medium priority band, and a third queue for the high priority band. It may be appreciated that any number of priority bands and queues may be implemented, and that each priority band may relate to a different priority (e.g., level of service/performance) given for an object. When there is a saturation situation, I/O operations are queued within the queues based upon the priority bands of the objects targeted by the I/O operations. That is, if an I/O operation targets a volume assigned to the medium priority band, then the I/O operation is queued into the second queue associated with the medium priority band.

A selection function is used to dequeue and reevaluate queued I/O operations from the queues. Various selection functions will be described in further detail, which may utilize random number generators, probability functions, and weights. For example, each queue is weighted according to the priority band with which the queue is associated (e.g., a weight of 1 for the first queue associated with the low priority band, a weight of 2 for the second queue associated with the medium priority band, and a weight of 4 for the third queue associated with the high priority band). The weights also take into account the number of objects associated with each priority band such as 5 volumes assigned to the high priority band, 2 volumes assigned to the medium priority band, and 9 volumes assigned to the low priority band. The weights of the queues and the number of objects associated with each priority band are used by a selection function to determine which queues and I/O operations should be dequeued and reevaluated by the rate buckets to see if the I/O operations can be routed to the filesystem for execution because there is no resource saturation or should be re-queued because there is resource saturation. In this way, I/O operations are throttled for shaping I/O during resource saturation situations by queuing and dequeuing I/O operations based upon resource saturation.

Various embodiments of the present technology provide for a wide range of technical effects, advantages, and/or improvements to computing systems and components. For example, various embodiments may include one or more of the following technical effects, advantages, and/or improvements: 1) non-routine and unconventional dynamic implementation of a quality of service policy for a distributed storage environment; 2) non-routine and unconventional dynamic implementation of a quality of service policy that is based upon resource saturation; 3) dynamic modification of a quality of service policy based upon storage operating system statistics; 4) non-routine and unconventional use of priority bands, rate buckets, queues, credit pools, and quality of service providers for throttling I/O according to resource saturation based quality of service policies; and/or 5) distributed storage system with unconventional components configured to implement dynamic quality of service policies for write caches to protect distributed backend storage from becoming overloaded.

In the following description, for the purposes of explanation, newer specific details are set forth in order to provide a thorough understanding of embodiments of the present technology. It will be apparent, however, to one skilled in the art that embodiments of the present technology may be practiced without some of the specific details. While, for convenience, embodiments of the present technology are described with reference to a distributed storage system, embodiments of the present technology are equally applicable to various other types of hardware, software, and/or storage environments.

The phrases "in some embodiments," "according to some embodiments," "in the embodiments shown," "in one embodiment," and the like generally mean the particular feature, structure or characteristic following the phrase is included in at least one implementation of the present technology, and may be included in more than one implementation period in addition such phrases do not necessarily refer to the same embodiment or different embodiments.

FIG. 1A is a block diagram illustrating an example of a system 100 including a distributed storage system 108 where a quality of service policy 116 is dynamically implemented. In the embodiments illustrated in FIG. 1A, the distributed storage system 108 includes nodes that provide storage services for clients. The nodes, such as a first node 110, may be hosted by the distributed storage system 108 as containers (e.g., Kubernetes containers), virtual machines, serverless threads, or other hardware and/or software. The nodes can be dynamically created and deconstructed on-demand based upon current load of the distributed storage system 108. The nodes provide clients, such as a first client 102 and a second client 104, with access to distributed backend storage 112 accessible to the nodes.

The first node 110 hosts a file system 122, such as a write anywhere file layout file system, used to organize and store data within the distributed backend storage 112. As the distributed storage system 108 receives I/O operations 106 from clients, the I/O operations 106 are processed by a storage management service (SMS) layer that is distributed amongst the nodes of the distributed storage system 108. When the SMS layer receives an I/O operation, the SMS layer routes the I/O operation to a data management service (DMS) layer of a node that is to process the I/O operation upon the distributed backend storage 112.

Because resources of the distributed storage system 108 are finite, a quality of service policy 116 is defined and dynamically implemented by the first node 110 for processing I/O operations routed to the first node 110. The quality of service policy 116 is implemented through a data management service 114 (a DMS layer) and is node scoped such that resource saturation of the first node 110 is used to throttle and shape I/O, as opposed to being implemented through the storage management service layer in a distributed manner across the nodes, which would have high coordination overhead.

As part of dynamically implementing the quality of service policy 116, an object is mapped to a set of rate buckets 118 (e.g., credit pools). For example, when the object is created, a quality of service workload identifier is mapped to an object identifier of the object, which is further described in relation to FIG. 4B. The quality of service workload identifier is associated with the set of rate buckets 118. The object may be a vserver, a file system service, a logical unit number (LUN), a volume, a slice service that uses slice files to track where data is stored within the distributed storage (e.g., a slice file used as an indirection layer to locate and access data within storage devices making up the distributed backend storage 112), a directory, a file, etc.

Each rate bucket may utilize different algorithms for throttling I/O. In some embodiments, a rate bucket is used to queue I/O operations based upon local resource saturation. When utilization of a local resource reaches a saturation point (e.g., 92% memory utilization), then the rate bucket starts to queue I/O operations in order to throttle and shape the I/O operations. In some embodiments, a rate bucket is used to queue I/O operations based upon processor saturation from resource utilization by the data management service 114. That is, the data management service 114 consumes processor resources when processing I/O operations 130. When utilization of the processor resources reaches a processor resource saturation point (e.g., 95% processor utilization), then the rate bucket starts to queue I/O operations in order to throttle and shape the I/O operations. In some embodiments, a rate bucket is used to queue I/O operations based upon saturation of a write cache. That is, the write cache may be used to process certain I/O operations (e.g., write data of write operations into the write cache before flushing the cached write data to the distributed backend storage 112). In order to keep the write cache from becoming overloaded, the rate bucket monitors utilization of the write cache. When utilization of the write cache reaches a saturation point (e.g., a certain rate of data being cached into the write cache; a percentage of remaining free storage space of the write cache being below a threshold; etc.), then the rate bucket starts to queue I/O operations in order to throttle and shape the I/O operations so that the I/O operations do not overload the write cache. It may be appreciated that the operation of different rate buckets will be subsequently described in further detail.

When a rate bucket processes an I/O operation, the rate bucket will indicate whether there is resource saturation or not (e.g., whether utilization of a resource has exceed a threshold such as where utilization of a processor exceeds 95% for a particular timespan such as 5 seconds). Thus, the data management service 114 will either route the I/O operation to the file system 122 for execution if all rate buckets indicate that there is no resource saturation or the data management service 114 will queue the I/O operation into a queue selected from a set of queues 120 because at least one rate bucket indicating that there is resource saturation.

As part of a rate bucket determining whether there is resource saturation while evaluating the I/O operation, the rate bucket uses a set of credits pools to determine whether there is a resource saturation. The set of credit pools includes a total credit pool, a read credit pool, and a write credit pool. Credits within the set of credit pools are consumed by incoming I/O operations. If there are not enough credits in a particular credit pool for the I/O operation (e.g., the read credit pool does not have enough credits for a read operation, the write credit pool does not have enough credits for a write operation, the total credit pool does not have enough credits for any type of operation, etc.), then there is a resource saturation event and the data management service 114 will queue the I/O operation. In some embodiments, the set of credit pools are set (e.g., as an initial/default setting) to an unlimited amount of credits when there is no resource saturation so that resources can be fully utilized for improved performance and resource utilization. When there is a resource saturation situation, then the credits within the credit pools are set based upon minimum I/O processing rate recommendations from quality of service providers assigned to the rate bucket. A quality of service provider is an algorithm that monitors resource utilization of a particular resource and calculates and provides the rate bucket with minimum I/O processing rate recommendations based upon the resource utilization. Credits are replenished for fixed time intervals by a quality of service controller that may execute as a thread.

The rate bucket is backed by one or more quality of service providers that provide the rate bucket with credits per second target recommendations for allocating credits to I/O operations from the credit pools. For example, a processor quality of service provider executes an algorithm to monitor processor utilization. When the algorithm detects resource saturation of the processor based upon the monitored process utilization, the algorithm calculates a minimum I/O processing rate recommendation that is provided to the rate bucket. The minimum I/O processing rate recommendation may specify a maximum I/O rate per second of credits to allocate from a credit pool. A quality of service controller (e.g., a thread) refreshes credits for fixed time intervals for rate buckets controlled by the quality of service controller. In this way, rate buckets assigned to an object targeted by the I/O operation will evaluate the I/O operation to determine whether there are adequate credits for executing the I/O operation, or there are not adequate credits, and the I/O operation is to be queued within a queue, which results in I/O throttling based upon resource saturation. The rate buckets allocate credits based upon recommendations from the quality of service providers, and the quality of service controller refreshes credits within the credit pools.

The quality of service policy 116 also utilizes priority bands assigned to the objects for dynamically throttling I/O. A high priority band is assigned to objects given a high priority (high performance guarantees), a medium priority band is assigned to objects given a medium priority (medium performance guarantees), a low priority band is assigned to objects given a low priority (low performance guarantees), etc. A priority band may be a level of service (an amount of performance such as throughput, IOPS, latency, etc.) that is provided by (guaranteed by) the quality of service policy 116 for a particular object. For example, a user that owns the object may pay for a certain amount of guaranteed service (performance) that can be met by a particular amount of resources. This guaranteed is tracked and enforced through the quality of service policy 116 through priority bands. It may be appreciated that any number or type of priority bands can be implemented. Each queue of the queues 120 is associated with one of the priority bands, and thus an I/O operation targeting an object with a particular priority band will be queued in a corresponding queue having that priority band.

The priority bands can also be used to determine how to dequeue and reevaluate I/O operations, thus resulting in I/O throttling based upon the different priority bands. I/O operations within a high priority band queue will be dequeued a certain proportion more than I/O operations within a medium priority band queue (e.g., twice as often). I/O operations within the medium priority band queue will be dequeued a certain proportion more than I/O operations within a low priority band queue (e.g., twice as often). When an I/O operation is dequeued, the I/O operation is reevaluated again by the rate buckets assigned to the object to see if any rate bucket indicates resource saturation. If there is resource saturation, then the I/O operation is queued again. If no rate bucket indicates resource saturation, then the I/O operation is routed to the file system 122 for execution.

Figure 1B:
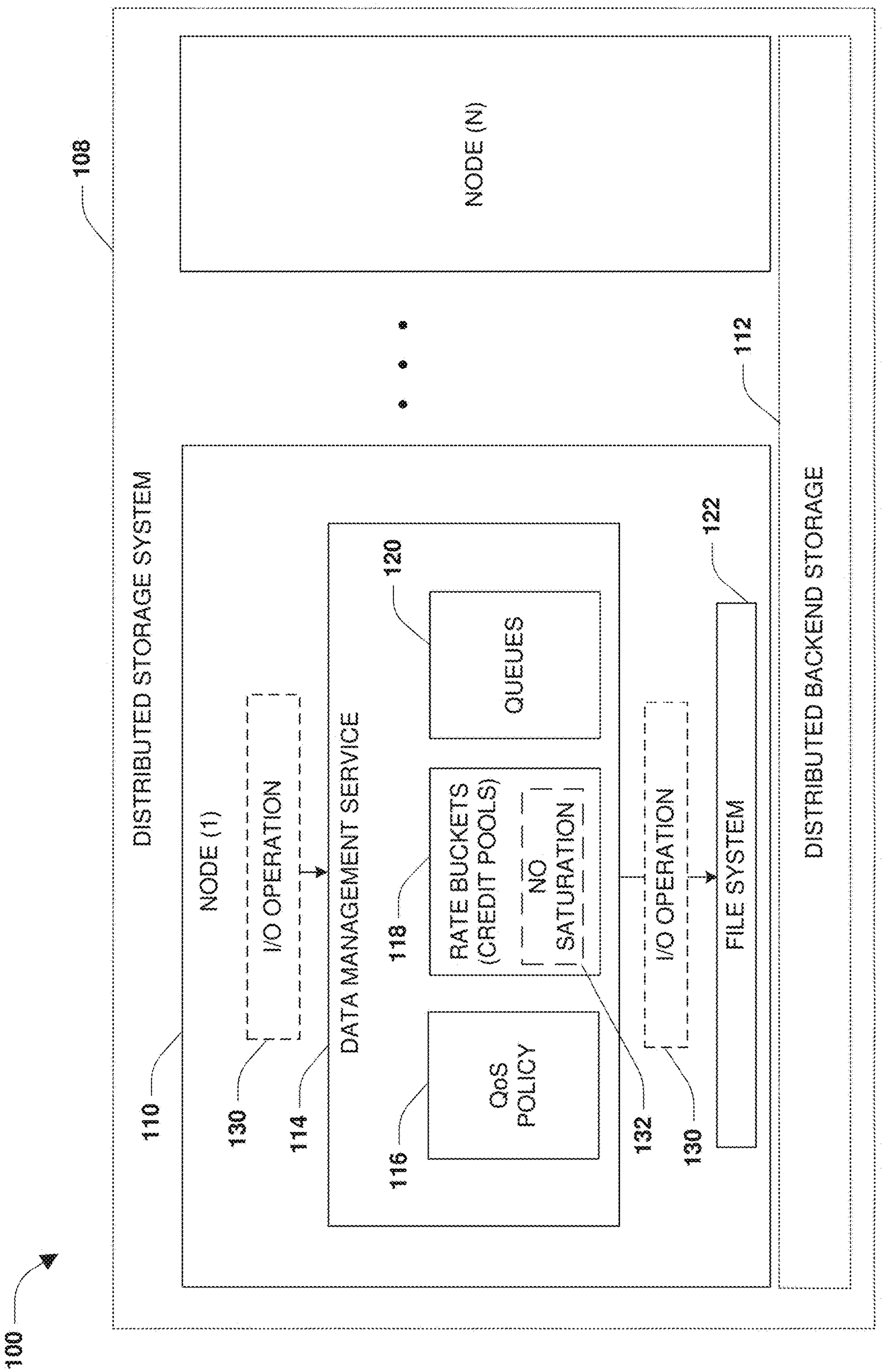
FIG. 1B is a block diagram illustrating an example of a distributed storage system where an I/O operation is routed to a file system in accordance with an embodiment of the present technology.

FIG. 1B is a block diagram illustrating an example of the distributed storage system 108 where an I/O operation 130 is routed to the file system 122. The I/O operation 130 is received by the distributed storage system 108 from a client device and is routed by the storage management service (SMS layer) to the data management service 114 (DMS layer) of the first node 110 for processing. As part of dynamically implementing the quality of service policy 116, the data management service 114 identifies a set of rate buckets, of the rate buckets 118, that are mapped to an object (e.g., a volume) targeted by the I/O operation 130. Accordingly, one or more of the rate buckets are used to determine how to process the I/O operation 130 (e.g., queue the I/O operation 130 or execute the I/O operation 130) based upon whether a resource saturation condition exists. Resource saturation may correspond to whether credit pools maintained by each of the rate buckets have adequate credits or not. If a rate bucket determines that at least one corresponding credit pool does not have adequate credits for consumption by the I/O operation 130, then a resource saturation condition is reported by the rate bucket (the I/O operation 130 fails to pass the rate bucket) and that the I/O operation 130 should be queued. If all rate buckets assigned to the object indicate that there is no resource saturation 132, then the I/O operation 130 is not queued and is routed to the file system 122 for execution, as illustrated by FIG. 1B.

Figure 1C:
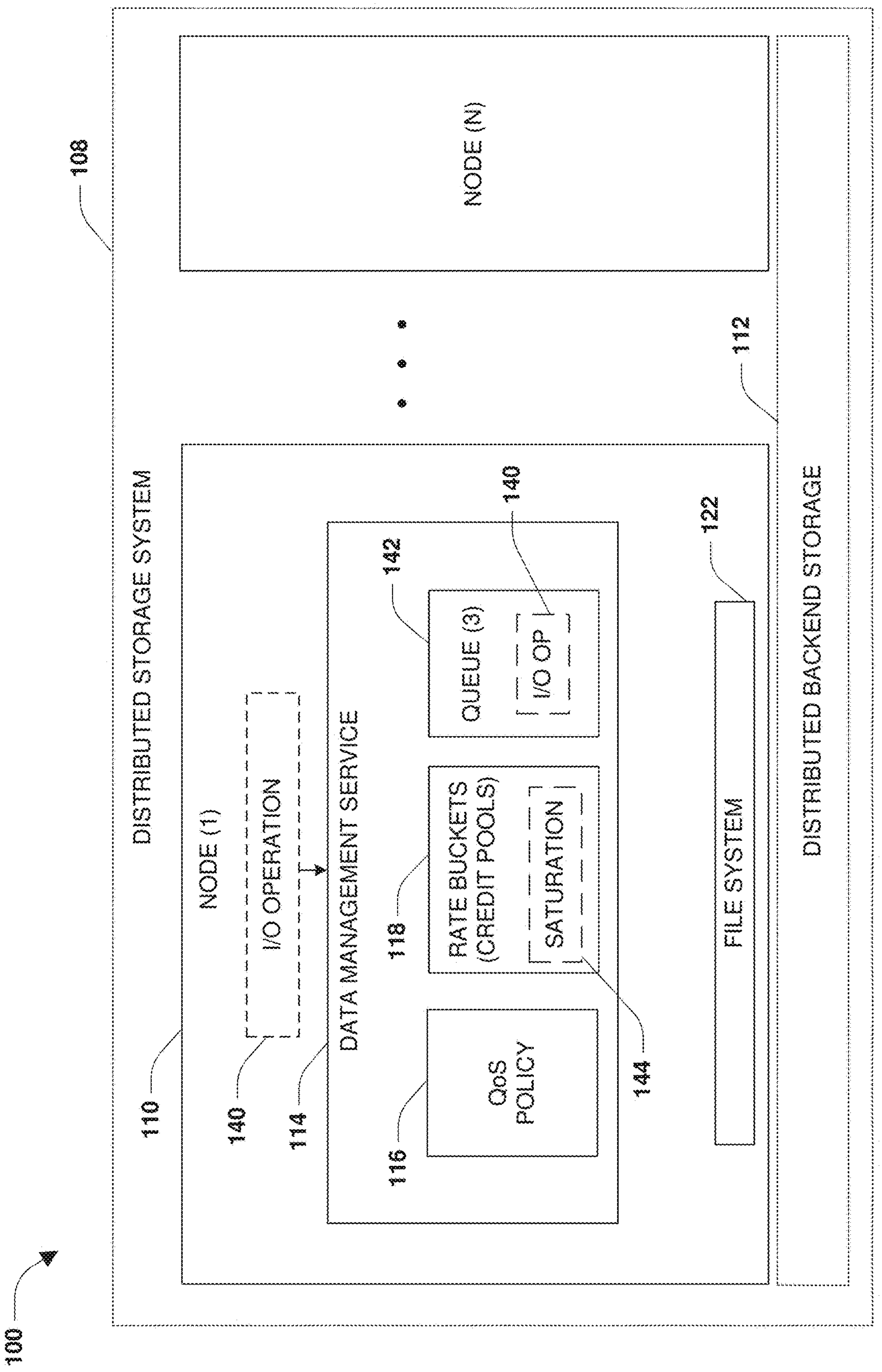
FIG. 1C is a block diagram illustrating an example of a distributed storage system where an I/O operation is queued in accordance with an embodiment of the present technology.

FIG. 1C is a block diagram illustrating an example of the distributed storage system 108 where an I/O operation 140 is queued. The I/O operation 140 is received by the distributed storage system 108 from a client device, and is routed by the storage management service to the data management service 114 of the first node 110 for processing. As part of dynamically implementing the quality of service policy 116, the data management service 114 identifies a set of rate buckets, of the rate buckets 118, as being mapped to an object (e.g., a vserver) targeted by the I/O operation 140. Accordingly, each of the rate buckets are used to evaluate the I/O operation 140 to determine whether a resource saturation condition exists based upon credit pools maintained by each of the rate buckets. One of the rate buckets may determine that a credit pool does not have enough credits for the I/O operation 140 to consume, which is indicative of resource saturation 144 (e.g., processor saturation of 92%). A third queue 142 is selected from the queues 120 for queuing the I/O operation 140 based upon the third queue 142 being associated with a priority band that is assigned the object targeted by the I/O operation 140. In this way, the I/O operation 140 is queued into the third queue 142.

Figure 1D:
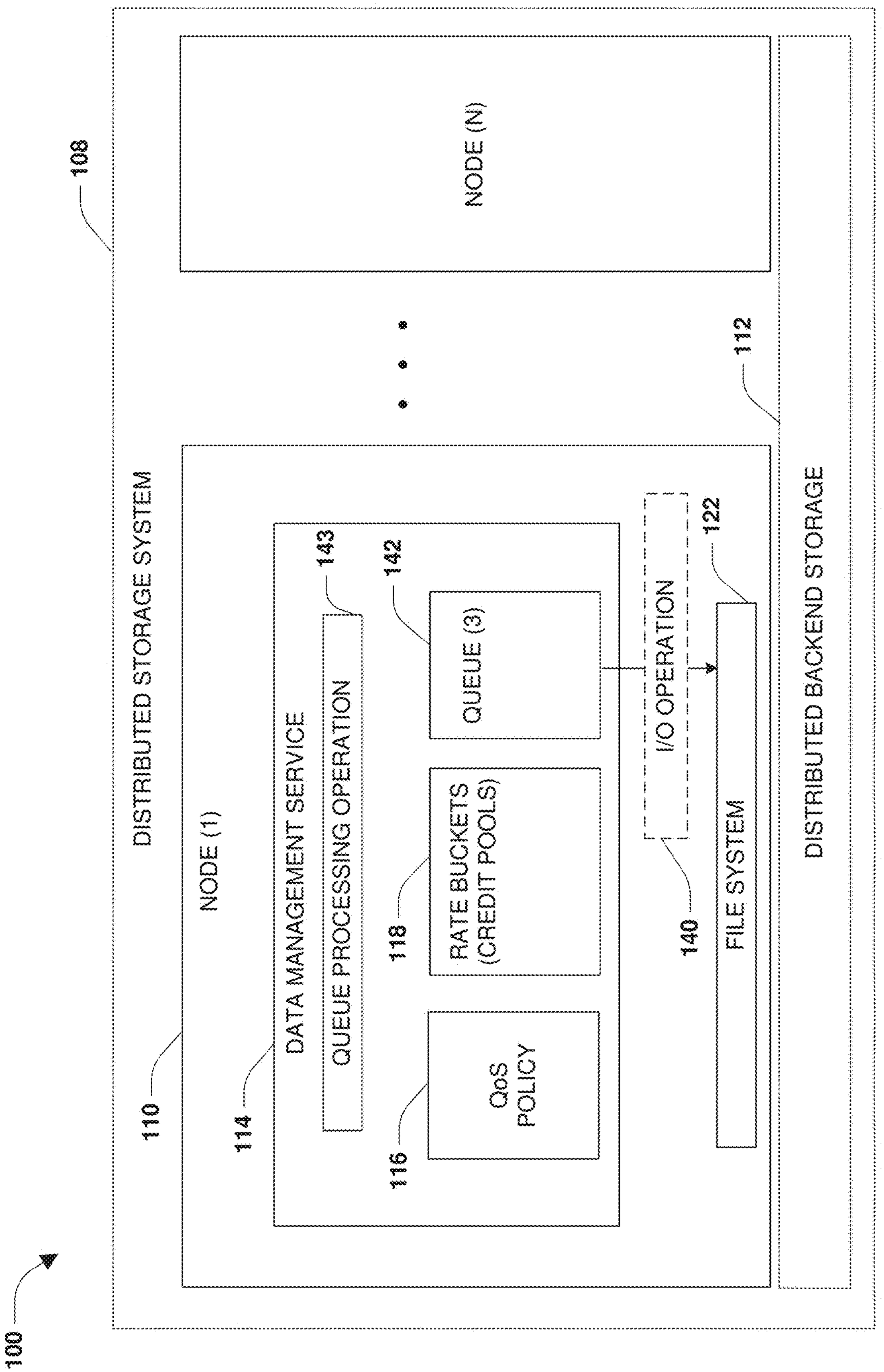
FIG. 1D is a block diagram illustrating an example of a distributed storage system where an I/O operation is dequeued and reevaluated in accordance with an embodiment of the present technology.

FIG. 1D is a block diagram illustrating an example of the distributed storage system 108 where the I/O operation 140 is dequeued and reevaluated. A queue processing operation 143 is executed to determine how to select and dequeue I/O operations from the queues 120. The queue processing operation 143 is configured to select queues based upon proportions derived from the priority bands of the queues, such as where a 2× proportion of I/O operations are dequeued and reevaluated from the medium priority band queue compared to the low priority band queue, and a 2× proportion of I/O operations are dequeued and reevaluated from the high priority band queue compared to the medium priority band queue. The queue processing operation 143 may dequeue the I/O operation 140 from the third queue 142 and reevaluate the I/O operation 140 using the rate buckets assigned to the object targeted by the I/O operation 140. If all of the rate buckets indicate that there is no resource saturation, then the I/O operation 140 is routed to the file system 122 for execution, otherwise, the I/O operation 140 is queued again.

In some embodiments of the queue processing operation 143, a selection technique, such as a random number generator and a probability function, are used to select and reevaluate I/O operations from the queues 120. Each queue is weighted (e.g., 1 for the low priority band queue, 2 for the medium priority band queue, and 4 for the high priority band queue). The weights of the queues 120 and the number of objects associated with each priority band of the queues 120 is used to determine which I/O operations should be dequeued and reevaluated by the rate buckets (e.g., a random number is generated and modded by a sum of the weights of the queues 120 for selecting an I/O operation from a particular queue to process), which is further illustrated by FIG. 3B. In this way, the queue processing operation 143 is executed to dequeue and reevaluate I/O operations from the queues 120, thus throttling I/O.

Figure 2:
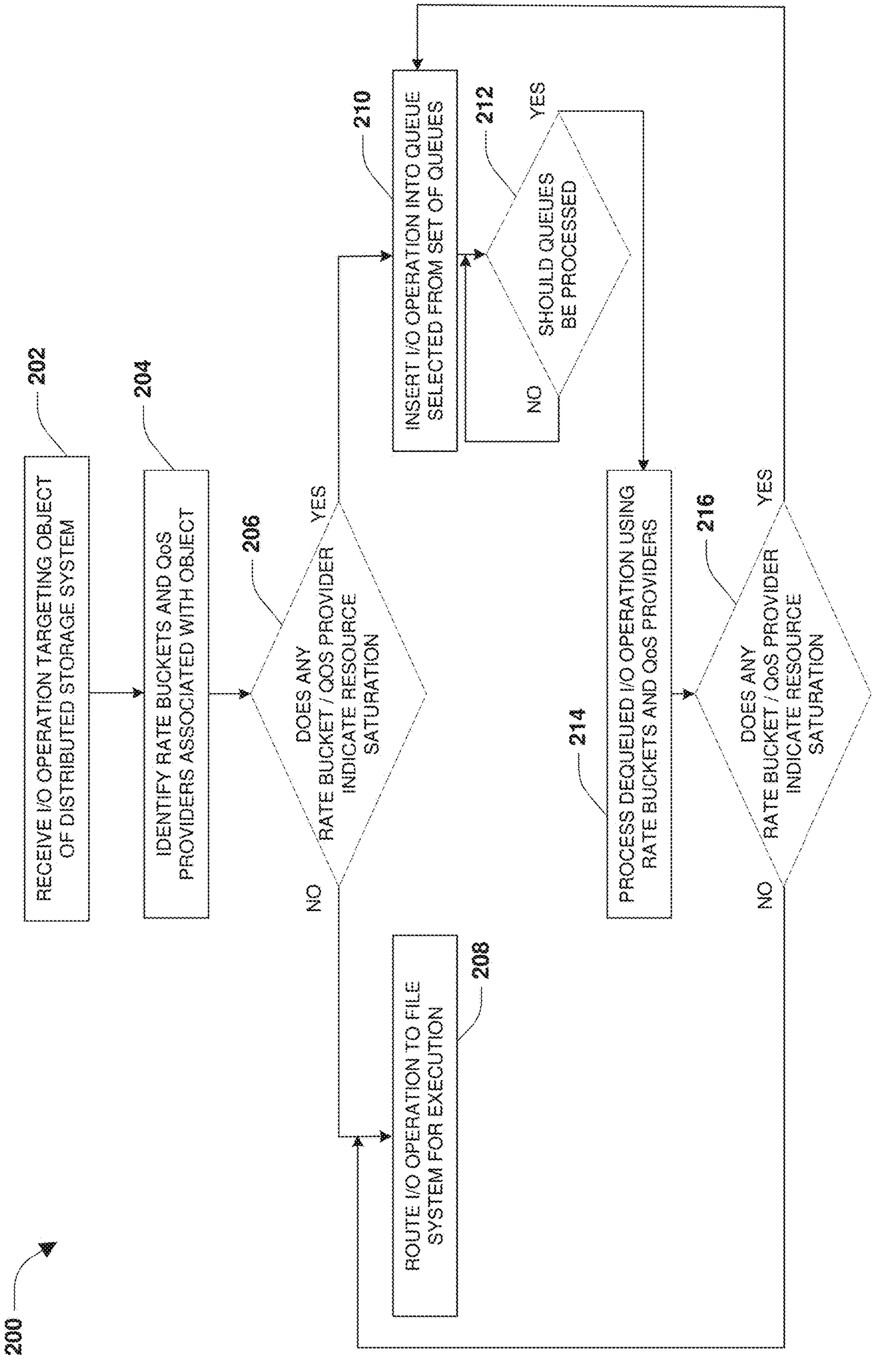
FIG. 2 is a flow chart illustrating an example of dynamically implementing a quality of service policy in accordance with various embodiments of the present technology.
Figure 3A:
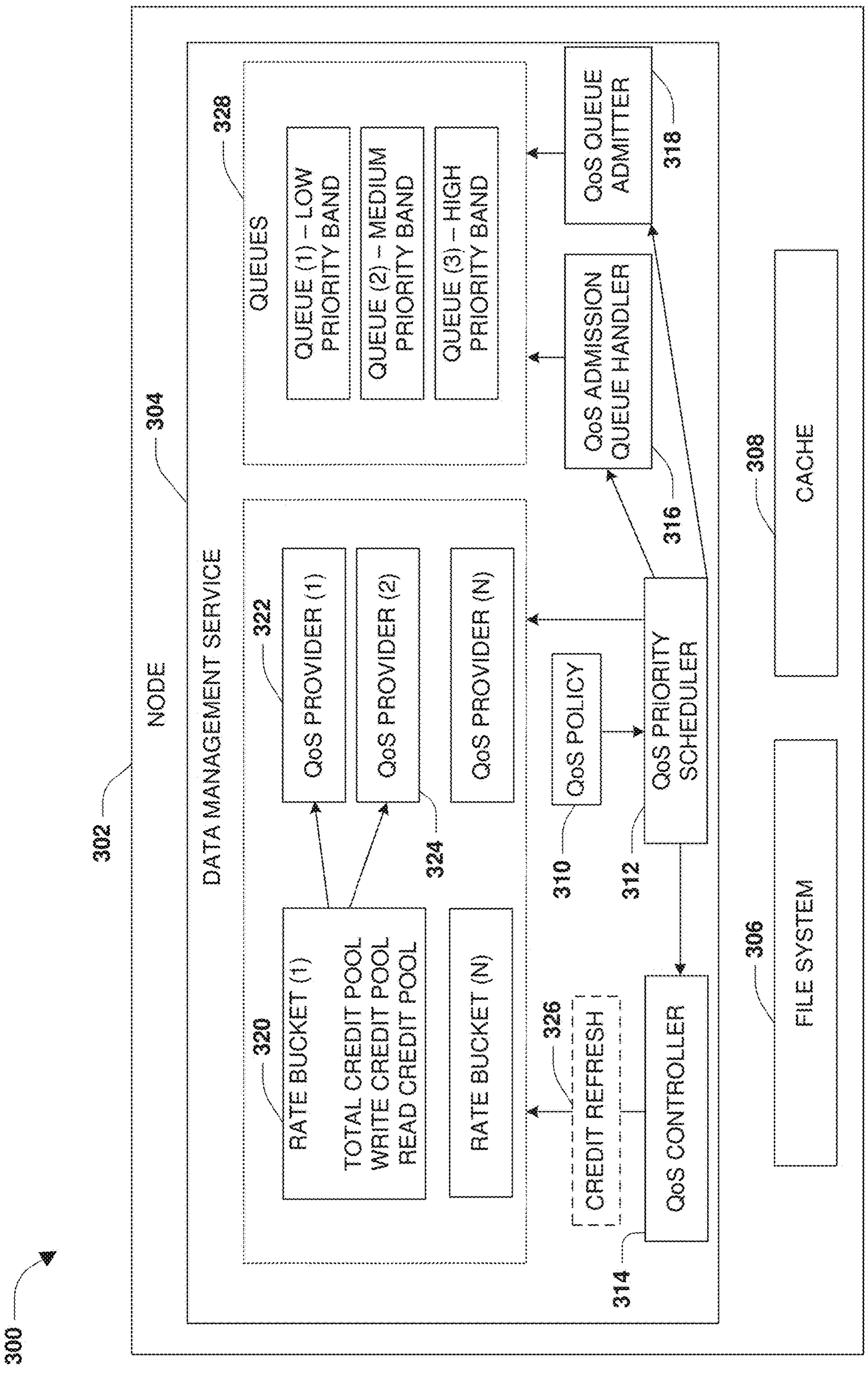
FIG. 3A is a block diagram illustrating an example of a node where a quality of service policy is dynamically implemented in accordance with an embodiment of the present technology.
Figure 3B:
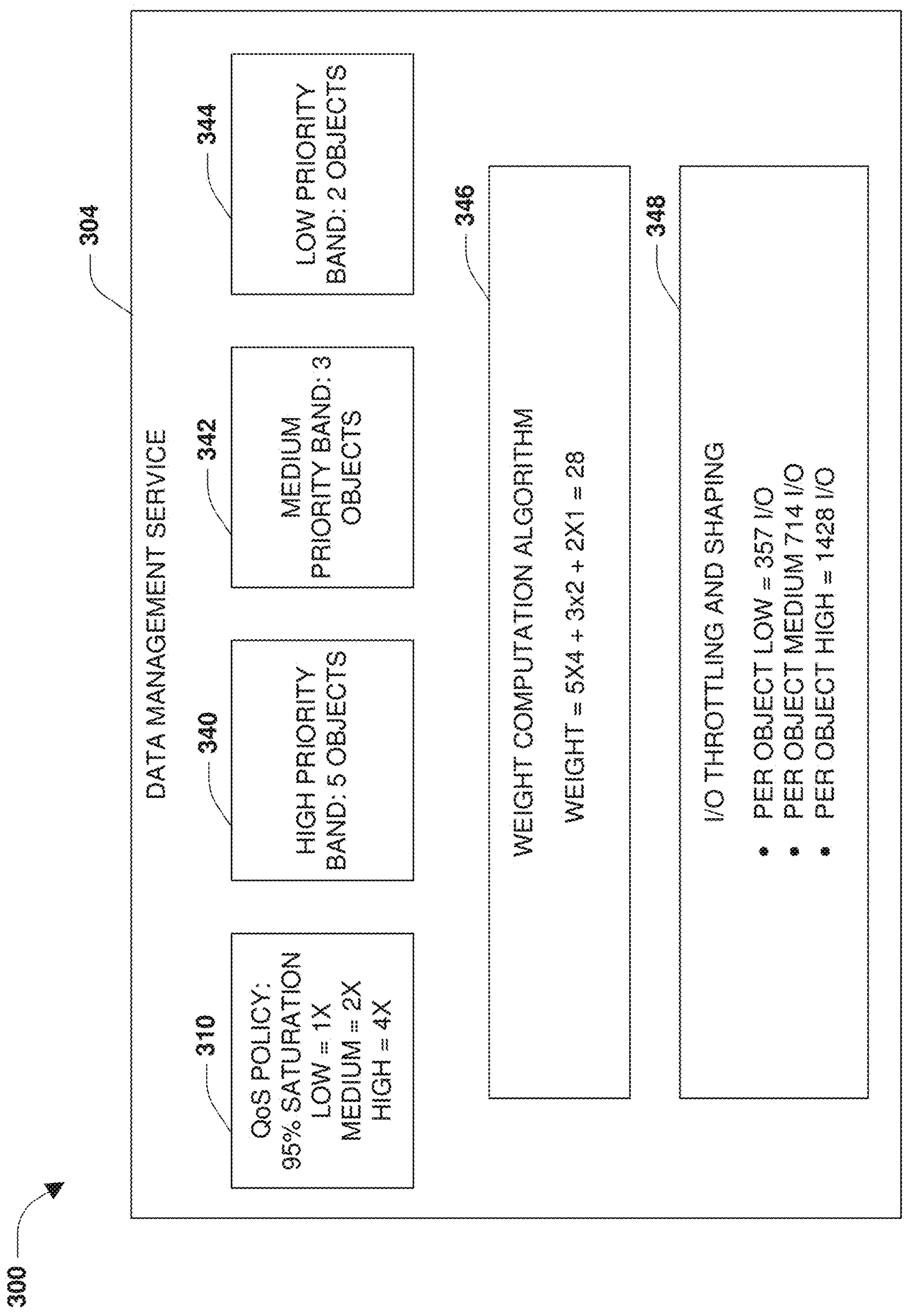
FIG. 3B is a block diagram illustrating an example of a data management service where I/O throttling is performed in accordance with an embodiment of the present technology.

FIG. 2 is a flow chart illustrating an example of a method 200 for dynamically implementing a quality of service policy 310, which is further described in relation to FIG. 3A illustrating a system that includes a node 302 where the quality of service policy 310 is dynamically implemented and FIG. 3B illustrating a data management service 304 where I/O throttling is performed. The node 302 may be a computing device, a container, a virtual machine, etc. The node 302 includes the data management service 304. The data management service 304 dynamically implements the quality of service policy 310 to throttle and shape I/O operations that are executed by the node 302 through a file system 306. The data management service 304 may also include a cache 308 used to process I/O operations for improved performance compared to executing the I/O operations upon distributed backend storage accessible to the node 302.

As part of dynamically implementing the quality of service policy 310, the quality of service policy 310 is used to configure a quality of service priority scheduler 312 for scheduling I/O operations for I/O throttling and shaping. The quality of service priority scheduler 312, along with other components used for dynamically implementing the quality of service policy 310 such as a quality of service controller 314, a quality of service admission queue handler 316, a quality of service queue admitter 318, rate buckets, quality of service providers, and/or queues 328, may be hosted within or managed by the data management service 304.

Rate buckets are created and mapped to objects hosted by the node 302. In some embodiments, quality of service providers are created or destroyed along with rate buckets that are assigned to the quality of service providers. For example, the quality of service providers and/or the rate buckets are created or destroyed when the node 302 boots up, when an object (e.g., a volume) for which the quality of service policy 310 is to be dynamically applied is created, when the quality of service policy 310 is modified, etc. The objects may be vservers, file system services, LUNs, volumes, slice services, a directory, a file, etc. The quality of service priority scheduler 312 defines rate buckets that are used for evaluating I/O operations to determine whether the I/O operations can be routed to the file system 306 for execution or the I/O operations should be queued within the queues 328 because a resource saturation condition exists. The quality of service priority scheduler 312 defines credit pools for the rate buckets. For example, the quality of service priority scheduler 312 defines a first rate bucket 320 with a total credit pool with credits that can be used by any operation, a write credit pool with credits that can be used by write operations, and a read credit pool with credits that can be used by read operations.

The quality of service priority scheduler 312 selects quality of service providers, from available quality of service providers, to assign to the rate buckets. A rate bucket may be assigned to one or more quality of service providers, and a quality of service provider may be assigned to one or more different rate buckets. For example, a first quality of service provider 322 and a second quality of service provider 324 are assigned to the first rate bucket 320. In some embodiments, a quality of service provider provides a maximum I/O rate per second recommendation for a rate bucket to utilize for determining and/or allocating available credits from a credit pool, which is used for I/O throttling by the rate bucket. Various different quality of service providers may be selected. A processor quality of service provider sets a total credit pool for I/O throttling based upon processor load utilization, such as whether CPU is reaching saturation (e.g., 94% utilization). A configuration limit quality of service provider implements quality of service configuration for a maximum I/O operations per second (IOPS) setting and/or a burst setting (e.g., a maximum IOPS when there is a burst of IOPS as opposed to during normal operation). A slice service load quality of service provider implements write throttling based upon thresholds applied to a slice service load of a slice service that tracks storage locations of data within the distributed backend storage. A cache quality of service provider implements write throttling based upon a current load in order to protect the distributed backend storage and/or the cache from being overloaded. Write throttling may be facilitated by a rate bucket based upon a maximum I/O rate per second recommendation provided by a quality of service provider, which may be used to determine an amount of available credits within a write credit pool of the rate bucket for executing write operations.

Over time, credits within the total credit pool, the write credit pool, and the read credit pool will be consumed by I/O operations that are routed to the file system 306 for execution. The quality of service priority scheduler 312 uses the quality of service policy 310 to configure and control a quality of service controller 314 to refresh 326 credits within the different credit pools for fixed time intervals. For example, the quality of service policy 310 may specify a number of credits to add to a particular credit pool on a certain fixed periodic basis. If a credit pool runs out of credits before a next refresh, then a resource saturation situation may be occurring. The quality of service controller 314 may be executed as a thread that is continuously running and refreshing credits for rate buckets that are controlled by the quality of service controller 314.

If there is a resource saturation situation, then an I/O operation is queued within a select queue of the queues 328. The queues 328 may comprise a first queue associated with a low priority band, a second queue associated with a medium priority band, a third queue associated with a high priority band, and/or other queues associated with other priority bands. I/O operations target various objects that may be assigned to certain priority bands. Thus, if an I/O operation is to be queued, then the I/O operation is queued into a queue that is assigned the same priority band as an object targeted by the I/O operation. A quality of service queue admitter 318 is configured to insert the I/O operations into select queues of the queues 328 when at least one rate bucket identifies a resource saturation situation for the I/O operations (e.g., a credit pool lacking adequate credits for processing an I/O operation). In some embodiments, the quality of service queue admitter 318 utilizes round trip operation completion statistics (e.g., a round trip time of an I/O operation successfully being executed) for determining whether to queue the I/O operations. In some embodiments, the quality of service queue admitter 318 performs priority band selection in pre-defined ratios amongst the queues 328 according to priority bands of objects targeted by the I/O operations and of the queues 328, such as to queue a certain ratio/proportion of I/O operations into the first queue, a certain ratio/proportion of I/O operations into the second queue, and a certain ratio/proportion of I/O operations into the third queue. In this way, the quality of service priority scheduler 312 controls the quality of service queue admitter 318 to utilize the queues 328 in order to queue/park I/O operations until adequate credits are available.

The quality of service priority scheduler 312 controls a quality of service admission queue handler 316 (e.g., executed as a thread) to execute a queue processing operation to dequeue and process queued I/O operations from the queues 328 using a selection technique. The quality of service admission queue handler 316 utilizes the queue processing operation to determine which queues and/or I/O operations to dequeue and reevaluate using rate buckets to see if the I/O operations can be routed to the file system 306 for execution (e.g., if all rate buckets indicate that there is no resource saturation) or should be queued again for later re-evaluation again (e.g., at least one rate bucket indicates resource saturation). If a queued I/O operation has been pending within a queue for a threshold timespan, then the quality of service admission queue handler 316 may abort the queued I/O operation. The queue processing operation utilized by the quality of service admission queue handler 316 may use a weight computation algorithm 346 for selecting queues and I/O operations to reevaluate, which will be further described in relation to FIG. 3B. Processing of the queues 328 by the quality of service admission queue handler 316 is performed to enforce various constraints specified by the quality of service policy 310, such as a per-node maximum I/O rate used as a node resource saturation point based upon processor load.

Because the quality of service policy 310 is being dynamically implemented by the data management service 304, the quality of service policy 310 may be dynamically adapted/modified. In some embodiments, the quality of service policy 310 is adapted to dynamically set and control a throughput ceiling limit for an object. Once the throughput ceiling limit is reached, I/O operations will be throttled (queued) for I/O shaping. In this way, the throughput ceiling limit specified by the quality of service policy 310 is used to throttle and shape I/O operations. In some embodiments, operating statistics of a storage operating system hosted by the distributed storage system are monitored. The operating statistics are used to generate I/O statistics on a workload basis. The I/O statistics may relate to IOPS of a workload implemented by the storage operating system, processing times of I/O operations of the workload, resource utilization for processing the I/O operations of the workload, amounts of data being read and written, a number of read operations and write operations over a timespan, etc. In this way, the quality of service policy 310 is adapted based upon the I/O statistics in order to more efficiently throttle and shape I/O operations. In some embodiments, the quality of service policy 310 is dynamically applied for the cache 308 in order to perform write throttling upon incoming I/O operations based upon load in order to protect distributed backend storage of the distributed storage system from being overloaded.

During operation 202 of method 200, the data management service 304 of the node 302 receives an I/O operation targeting an object such as a volume managed by the file system 306. The quality of service priority scheduler 312 of the data management service 304 identifies a mapping associated with the volume targeted by the I/O operation. The mapping associates the volume with a set of rate buckets such as the first rate bucket 320 and/or other rate buckets. Accordingly, the I/O operation is evaluated by each of the rate buckets of the set of rate buckets mapped to the volume. For example, the first rate bucket 320 is used to evaluate the I/O operation using the credit pools of the first rate bucket 320 in order to determine whether there are adequate credits to allow the I/O operation to execute. Additionally, each rate bucket is associated with one or more quality of service providers such as where the first rate bucket is associated with the first quality of service provider 322 and the second quality of service provider 324. In this way, the rate buckets associated with the volume and quality of service providers associated with the rate buckets are identified, during operation 204 of method 200. Each of the rate buckets and each of the quality of service providers associated with the rate buckets are used to evaluate the I/O operation using credit pools of the rate buckets to determine whether any rate bucket indicates resource saturation based upon a smallest value of maximum I/O processing rate recommendations and/or credits per second targets provided by the quality of service providers to the rate buckets for credit allocation. For example, a rate bucket uses the I/O processing rate recommendation to determine an amount of available credits of the rate bucket. The available credits can be allocated to I/O operations that consume the credits when executed. The I/O processing rate recommendation may include a maximum I/O rate per second recommendation, which relates to a maximum amount of credits that should be allocated per second for executing I/O operations that consume the allocated credits.

During operation 206 of method 200, a determination is made as to whether any of the rate buckets, allocating credits based upon instructions from the quality of service providers, indicate a resource saturation situation because there are not adequate credits within a credit pool for executing the I/O operation. In response to none of the rate buckets indicating a resource saturation situation, the I/O operation is routed to the file system 306 for execution, during operation 208 of method 200. In response to at least one rate bucket indicating that a resource saturation situation exists, the I/O operation is inserted in a queue selected from the queues 328, during operation 210 of method 200. The queue is selected based upon the queue being associated with a priority band of the volume. The queuing of the I/O operation due to the resource saturation situation results in I/O throttling based upon resource saturation.

During operation 212 of method 200, a selection technique is used to make a determination by the quality of service admission queue handler 316 as to whether one or more queued I/O operations within a particular queue of the queues 328 are to be dequeued and reevaluated. An embodiment of utilizing the selection technique is illustrated by FIG. 3B. In particular, the quality of service policy 310 may specify a resource saturation threshold for a particular resource such as 95% CPU utilization. The quality of service policy 310 may specify proportions of queued I/O operations to dequeue from queues corresponding to priority bands. For example, the quality of service policy 310 may specify that twice as many queued I/O operations within the second queue having the medium priority band are to be dequeued for reevaluation than queued I/O operations within the first queue having the low priority band. The quality of service policy 310 may specify that twice as many queued I/O operations within the third queue having the high priority band are to be dequeued for reevaluation than queued I/O operations within the second queue having the medium priority band. The resource saturation threshold, the priority bands, and proportions for the priority bands are used to configure the quality of service priority scheduler 312 for I/O throttling 348.

A high priority band may correspond to a high level of service/performance (e.g., a gold service level) guaranteed for objects assigned to the high priority band. A medium priority band may correspond to a medium level of service/performance (e.g., a silver service level) guaranteed for objects assigned to the medium priority band. A low priority band may correspond to a low level of service/performance (e.g., a bronze service level) guaranteed for objects assigned to the low priority band. The priority bands may be defined through the quality of service policy 310, and each priority band may be associated with a certain amount of guarantees service/performance (e.g., latency, IOPS, memory, bandwidth, compute resources, etc.).

There may be 5 objects assigned 340 to the high priority band, 3 objects assigns to the medium priority band, and 2 objects assigned to the low property. Weights are assigned to the queues based upon the number of objects assigned to the corresponding priority bands, such as where a weight of 2 is assigned to the first queue of the low priority band, a weight of 3 is assigned to the second queue of the medium priority band, and a weight of 5 is assigned to the third queue of the high priority band. The weights are used to by the selection technique to select queues and I/O operations to dequeue and reevaluate using corresponding rate buckets assigned to objects targeted by the I/O operations.

The selection technique utilizes the weights assigned to the queues and proportions assigned to the priority bands of the queues (proportions/percentages of I/O to direct to objects of certain priority bands) to calculate a total weight using a weight computation algorithm 346 for scheduling I/O operation (e.g., for selecting queues and I/O operations to dequeue and reevaluate). For example, a proportion of 4 may be associated with the high priority band, a priority of 2 may be associated with the medium priority band, and a priority of 1 may be associated with the low priority band. Accordingly, a total weight of 28 is calculated as 5 (the number of objects assigned 340 to the high priority band) multiplied by 4 (the proportion for the high priority band)+3 (the number of objects assigned 342 to the medium priority band) multiplied by 2 (the proportion for the medium priority band)+2 (the number of objects assigned 344 to the low priority band) multiplied by 1 (the proportion for the low medium priority band). The selection technique may utilize a random number generator and probability function to take into account the weights and numbers of objects associated with each priority band (e.g., combined as the weight of 28) to determine how to dequeue and reevaluate queued I/O operations. In this way, I/O throttling 348 is implemented such as where 357 I/O operations are dequeued and reevaluated per object assigned to the low priority band, 714 I/O operations are dequeued and reevaluated per object assigned to the medium priority band (twice as much as the low priority band), and 1428 I/O operations are dequeued and reevaluated per object assigned to the high priority band (twice as much as the medium priority band).

In some embodiments, the selection technique takes recommendations from the quality of service providers into consideration for performing the I/O throttling 348. For example, the selection technique receives minimum I/O processing rate recommendations from each of the quality of service providers, such as a minimum I/O processing rate recommendation from a processor quality of service provider based upon processor utilization, a minimum I/O processing rate recommendation from a cache quality of service provider based upon cache utilization, etc. A minimum I/O processing rate recommendation is selected from the received minimum I/O processing rate recommendations based upon a selection constraint (e.g., a most constraining minimum I/O processing rate recommendation may be selected). The selected minimum I/O processing rate recommendation is used to perform the I/O throttling 348 to ensure certain objects receive at least a minimum I/O processing rate specified by the minimum I/O processing rate recommendation.

If the selection technique identifies a queue to process during operation 212 of method 200, then a queued I/O operation is dequeued from the queue for reevaluate by rate buckets mapped to an object targeted by the dequeued I/O operation and quality of service providers assigned to the rate buckets, during operation 214 of method 200. During operation 216 of method 200, a determination is made as to whether any of the rate buckets, allocating credits based upon instructions from the quality of service providers, indicate a resource saturation situation because there are not adequate credits within a credit pool for executing the dequeued I/O operation. In response to none of the rate buckets indicating a resource saturation situation, the dequeued I/O operation is routed to the file system 306 for execution, during operation 208 of method 200. In response to at least one rate bucket indicating that a resource saturation situation exists, the dequeued I/O operation is re-inserted back into the queue for subsequent re-evaluation.

Figure 4A:
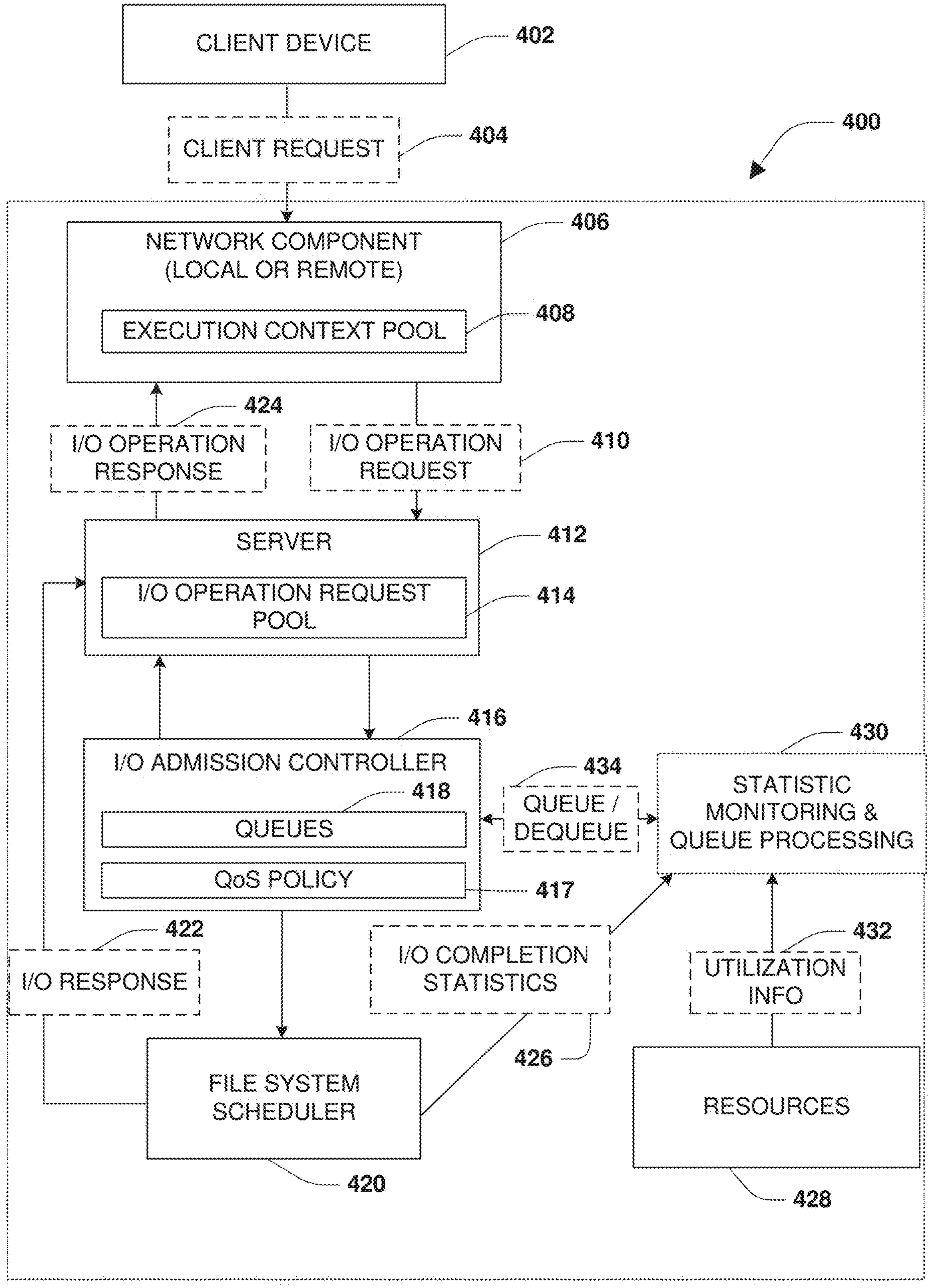
FIG. 4A is a block diagram illustrating an example of a system where a quality of service policy is dynamically implemented by a node in accordance with an embodiment of the present technology.

FIG. 4A is a block diagram illustrating an example of system 400 where a quality of service policy 417 is dynamically implemented by a node. The quality of service policy 417 is implemented by a data management service (DMS) layer (e.g., within a file system service hosted within a data D-blade) hosted above a file system (e.g., a write anywhere file layout file system) so that I/O operations are intercepted and processed using the quality of service policy 417 before reaching the file system. The quality of service policy 417 is implemented by an I/O admission controller 416, which may correspond to the quality of service priority scheduler 312 of FIGS. 3A and 3B. Because the quality of service policy 417 is implemented earlier in an I/O processing stack before the file system, the quality of service policy 417 can utilize CPU usage at the data management service layer for identifying CPU saturation. The CPU saturation is used to trigger throttling of I/O operations since the data management service layer is a common chokepoint where CPU can become saturated. Implementing the quality of service policy 417 within the data management service layer simplifies how the quality of service policy 417 is implemented because the data management service layer is node specific, and thus the quality of service policy 417 is node scoped (e.g., the quality of service policy 417 applies merely to a single node of a distributed storage system). Otherwise, if the quality of service policy 417 was implemented higher up in the I/O processor stack such as in a storage management service (SMS) layer (e.g., a network N-blade) that is distributed amongst the nodes of the distributed storage system, additional complex coordination would be required because multiple network N-blades could write to the same volume for which the quality of service policy 417 is being implemented.

The node implements the quality of service policy 417 within the I/O admission controller 416 that uses queues 418 to queue I/O operation when there is resource saturation. A statistics monitoring and queue processing component 430 monitors resource utilization information 432 of resources 428 to determine whether there is resource saturation, how to detect resource saturation, and/or limits and parameters to apply for determining resource saturation. The statistics monitoring and queue processing component 430 instructs 434 the I/O admission controller 416 to queue and dequeue I/O operations from the queues 418. In some embodiments, the I/O admission controller 416 and/or the statistics monitoring and queue processing component 430 are implemented as part of the quality of service priority scheduler 312, the quality of service admission queue handler 316, the quality of service controller 314, the quality of service providers, and/or the quality of service queue admitter 318 of FIGS. 3A and 3B.

A network component 406 (e.g., the network N-blade hosting the storage management service layer) that is either local to the node as illustrated by FIG. 4A or remote to the node receives a client request 404 from a client device 402. The network component 406 utilizes an execution context pool 408 to route the client request 404 as an executable I/O operation through an I/O operation request 410 to a server component 412 (SpinHi logic used to transmit messages to a file system) that processes the I/O operation request 410 using an I/O operation request pool 414. The I/O admission controller 416 intercepts the I/O operation from the server component 412 before the I/O operation is received by a file system scheduler 420 of the file system. The I/O admission controller 416, using the statistics monitoring and queue processing component 430, determines whether to queue the I/O operation based upon the quality of service policy 417 or to route the I/O operation to the file system scheduler 420 to schedule the I/O operation for execution by the file system.

If the I/O operation is not queued because there is no resource saturation and is routed to the file system scheduler 420, then the I/O operation is executed and an I/O operation response 422 is provided to the server component 412 that provides an I/O operation response 424 to the network component 406. The file system scheduler 420 also provides I/O completion statistics 426 (e.g., round trip time I/O completion statistics) to the statistics monitoring and queue processing component 430. In this way, the statistics monitoring and queue processing component 430 takes into account the I/O completion statistics 426 and the resource utilization information 432 of the resources (e.g., cache utilization, processor utilization, slice service utilization, etc.) when instructing 434 the I/O admission controller 416 to queue, dequeue, or skip queuing I/O operations as part of I/O operation throttling and shaping. Based upon the quality of service policy 417, the statistics monitoring and queue processing component 430 enforces a per-node maximum I/O rate as a node resource saturation point based upon CPU load or other resource utilization information 432. The per-node maximum I/O rate is used as the node resource saturation point for detecting resource saturation.

In some embodiments, the quality of service techniques provided herein throttle, prioritize, and monitor I/O operations for objects, such as vservers, volumes, LUNs, qtrees, directories, and files. The dynamic implementation of a quality of service policy provides for quality of service control for a maximum throughput limit (a throughput ceiling limit) for objects. The dynamic implementation of a quality of service policy provides for I/O priority handling for objects based upon priority bands assigned to the objects and queues. The dynamic implementation of a quality of service policy provides for write-only throttling to protect caches such as where incoming I/O operations are throttled based upon load of a slice service in order to protect distributed backend storage of a distributed storage system from being overloaded. The dynamic implementation of a quality of service policy provides for identifying and utilizing insightful I/O statistics on a workload basis for dynamically adapting the quality of service policy.

In some embodiments, the quality of service policy is implemented in a file system process of a node. Implementing the quality of service policy in the file system process allows reads to be directly serviced from a file system cache without having to be processed by other layers such as a slice service layer or a block layer that are used to locate data stored on storage devices of the distributed storage system. Implementing the quality of service policy in the file system process allows for reads to be directly service from the block layer (e.g., a layer used to locate blocks of storage where data is stored on the storage devices) without going through the slice service layer (e.g., an indirection layer). Implementing the quality of service policy in the file system process allows the quality of service policy to be implemented in a manner that avoids background processing, running the file system service, to generate I/O (background process I/O) that could result in undesirable throttling of client I/O. Implementing the quality of service policy in the file system process avoids situations where a file system service RAID/storage layer could keep retrying urgent I/O requests that need to be finished quickly, which can impact normal I/O requests that would not run.

In some embodiments, the quality of service policy is implemented in a D-blade of a node, as opposed to an N-blade of the node. The D-blade is a stack/code that implements a file system and other functionality/components related to the file system. The N-blade is a stack/code that implements client protocols such as a network file system (NFS) protocol and a server message block (SMB) protocol. A SCSI-blade is a stack/code that implements the client protocols related to iSCSI and NVMe. Implementing the quality of service policy in the D-blade provides for a common point to intercept I/O for quality of service policy enforcement irrespective of whether I/O is coming from a remote node or a local node for where an object is located. Implementing the quality of service policy in the D-blade provides for a common point to implement quality of service for queuing all I/O irrespective of which protocol is sending the I/O. Implementing the quality of service policy in the D-blade provides for a simplified approach that avoids the need for coordination amongst N-blades and SCSI-blades since all I/O will eventually arrive to a single D-blade that owns the object targeted by the I/O. Otherwise, if two or more N-blades were sending I/O to an object, then coordination would need to occur between the N-blades so that a total send I/O rate does not exceed a desired quality of service rate for enforcement.

In some embodiments, the quality of service policy is created through an API method such as: curl -k -X POST --header 'Content-Type: application/json'--header 'ACCEPT: application/json' -d '{"name": "testquality of service", "quality of servicePriorityBand": "Medium", "maxIOPS": 500, "burstIOPS": 500}'. The name "testquality of service" is the quality of service policy name. A priority band of the quality of service policy is set to a medium priority band. A max IOPS is set to 500 to indicate a limit for total I/O operations per second. A burst IOPS is set to 500 as a limit on how many I/O operations can go higher than the maxIOPS in a second when there are accumulated unused credits available. In some embodiments, the unused credits can accumulate within a timespan such as 60 seconds, and thus an I/O burst could potentially occur every 60 seconds. A priority band proportion is set as a default of 1× for low, 2× for medium, and 4× for high priority bands, which can be changed through the API method. Thus, 2× more I/O are scheduled for objects assigned the high priority band compared to object assigned the medium priority band, and 4× more I/O are scheduled for objects assigned the high priority band compared to object assigned the low priority band.

In some embodiments, the quality of service policy is applied to an object by an API method such as: curl -k -X POST -i --header 'Content-Type: application/json'--header 'ACCEPT: application/json' https://$mvip:2443/api/volumes -d '{"name": "testvol", "size": 902420000, "QoS Policy": {"uuid": "1 e0f9574-6646-59a4-9eae-aa50bef6bbb4"}, "nas": {"path": "/testvol"}}'. QoS Policy indicates a quality of service policy identifier (UUID) that is to be applied to the object such as a volume with a name testvol. If there is no quality of service policy specified during object creation, then a default quality of service policy is used with an unlimited max IOPS, unlimited burst IOPS, and a priority band set to medium.

In some embodiments, priority bands (quality of service performance bands) are used as part of implementing the quality of service policy. A priority band indicators I/O priority for an object during a resource saturation/starvation scenario (e.g., heavy CPU utilization). There can be any number of priority bands, such as high, medium, and low. A quality of service scheduler for priority handling is work-conserving such that the quality of service scheduler does not perform priority scheduling until there is resource saturation (e.g., 95% CPU utilization where a CPU resource is deemed to be contended for). If there is only I/O for a single priority band, then the I/O can consume all available resources since priority ordering of I/O amongst the priority bands is only enforced when there are I/O directed to objects assigned to different priority bands. Quality of service priority handling is done on a node basis and not cluster wide, thus I/O for an object with a low priority band quality of service policy will contend with I/O for an object with a high priority band quality of service policy only when both objects are hosted by a same node/data management service/D-blade.

In some embodiments, quality of service write-only throttling is performed. When a cluster becomes full, a quality of service policy immediately fails any new modifying NFS protocol operations (I/O operations) with errors. Quality of service write-only throttling is still performed to protect a cache based upon slice service load utilization.

Figure 4B:
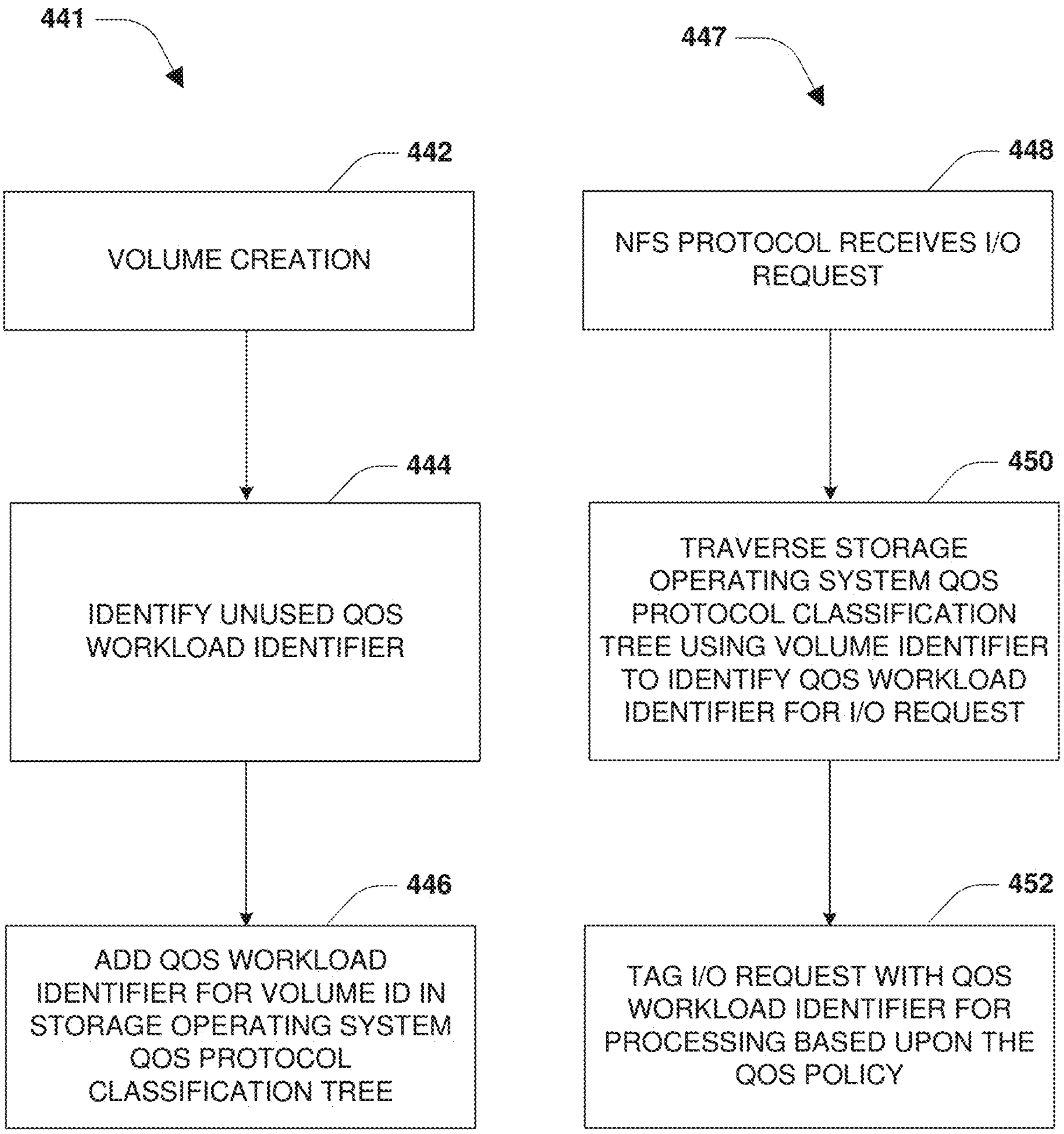
FIG. 4B are flow charts illustrating examples of volume creation and I/O operation processing according a quality of service policy in accordance with various embodiments of the present technology.

FIG. 4B are flow charts illustrating examples of volume creation and I/O operation processing according a quality of service policy. In some embodiments, storage operating system statistics are monitored and used as part of dynamic quality of service implementation. During object creation, a persistent object workload identifier is assigned to the object. For example, a volume is created, during operation 442 of method 441. The persistent object workload identifier is a range-bound number. At the file system service that owns the object, a quality of service workload identifier is encoded within a storage operating system classification tree during the creation of the object. For file system instances that do not own the object but receive I/O directed to the object (e.g., file system instances at other nodes that remotely receive I/O operations that will be redirected to the file system instance at the node owning the object), the quality of service workload identifier is encoded during mount of the object (e.g., during a volume mount operation). Accordingly, when the volume is created during operation 442 of method 441, an unused quality of service workload identifier is identified, during operation 444 of method 441. During operation 446 of method 441, the unused quality of service workload identifier is added for a volume identifier, of the volume, within the storage operating system classification tree so that incoming I/O operations targeting the volume will be processed using a corresponding quality of service policy.

When an incoming I/O operation is received during operation 448 of method 447, a network file system protocol (NFS) will look up the storage operating system classification tree to match the incoming I/O operation to a quality of service workload identifier, during operation 450 of method 447. The lookup is done using an object identifier known to NFS code/client. If the lookup identifies a matching tree node, then the tree node has the quality of service workload identifier. If the tree lookup fails to identify a matching tree node, a default/fixed quality of service workload identifier is assigned to the I/O operation. Once the I/O operation is tagged with the quality of service workload identifier by protocol code during operation 452 of method 447, then the quality of service workload identifier is retained and used through other layers processing the I/O operation in order to track statistics related to processing the I/O operation such as a round trip time of completing the I/O operation.

Figure 4C:
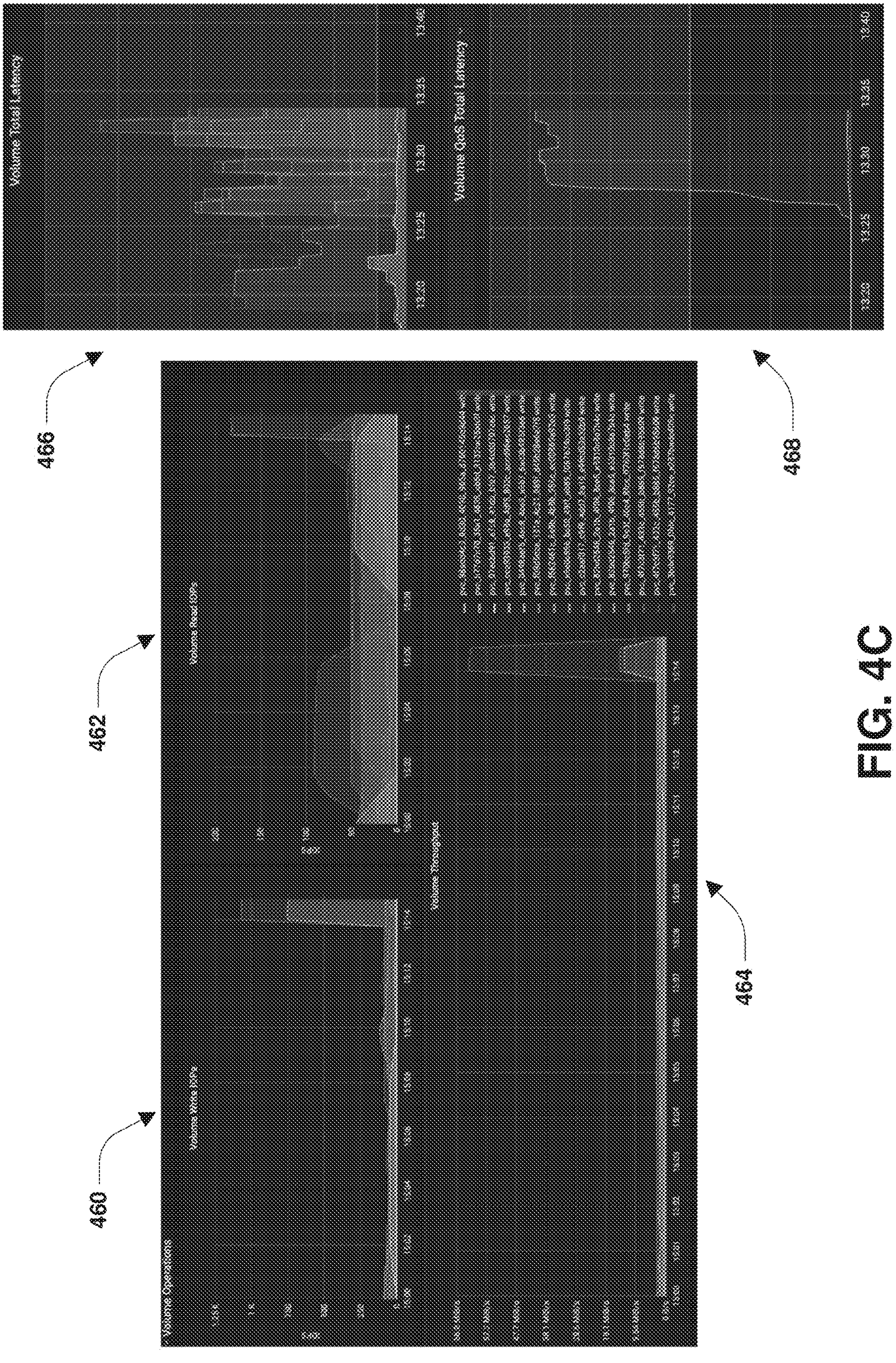
FIG. 4C are diagrams processing I/O operations using a quality of service policy in accordance with various embodiments of the present technology.

FIG. 4C are diagrams processing I/O operations using a quality of service policy. Diagram 460 illustrates volume write I/O operations per second for a volume. Diagram 462 illustrates volume read I/O operations per second for the volume. Diagram 464 illustrates volume throughput for the volume. Diagram 466 illustrates total latency for the volume. Diagram 468 illustrates volume quality of service total latency for the volume.

In some embodiments, rate buckets are implemented as part of dynamically implementing the quality of service policy. A rate bucket has functionality that checks for available credits to see if an I/O operation can be executed. The rate bucket may be associated with a total credit pool, a read credit pool, and a write credit pool. The rate bucket may be associated with one or more quality of service providers, and updates credit per second targets for each credit pool based upon recommendations from the quality of service providers. If there is more than one quality of service provider that is providing credit per second targets for the same credit pool, then a minimum value (most constraining recommended value) is used. In some embodiments, a rate bucket B1 is associated with a quality of service provider P1 and a quality of service provider P2. When rate bucket B1 requests a total credits per second value from the quality of service provider P1 and the quality of service provider P2, the quality of service provider P1 may recommend 1,000 and the quality of service provider P2 may recommend 2000. The rate bucket B1 uses 1000 as the total credits per second because it is the more constraining recommended value. Credits are checked for availability from a smallest pool. For reads, a check is performed from {read_credits_pool, total_credits_pool} or {write_credits_pool, total_credits_pool}. Credits are used from the smaller pool. For reads, credits are used from {read_credits_pool, total_credits_pool} or {write_credits_pool, total_credits_pool}. This enables the ability to implement quality of service control for only write operations. A rate bucket maintains bucket statistics such as used read/write bytes, incoming read/write bytes, etc. A rate bucket is for an object, such as a volume associated with a quality of service configuration limit provider, a slice service associated with a quality of service slice service load provider, a file system service D-blade associated with a file system service CPU load provider, etc.

In some embodiments, a quality of service provider is implemented with functionality used to generate a desired read credits per second, a desired write credits per second, and a desired total credits per second. One type of quality of service provider is a quality of service configuration limit provider. The quality of service configuration limit provider implements a quality of service configuration for a maximum IOPS and maximum burst IOPS. The quality of service configuration limit provider is associated with a volume rate bucket in order to specify maximum IOPS and maximum burst IOPS settings per volume. The quality of service configuration limit provider tracks unused credits per second for burst accumulation, such as to accumulate total unused credits up to a certain timespan such as 60 seconds (e.g., burst IOPS−maximum IOPS), but only allows up to maximum IOPS+(burst IOPS−maximum IOPS) worth of credits to be consumed per second. In some embodiments, the quality of service configuration limit provider may merely control total credits and may not separately control reads and writes differently.

In some embodiments, another type of quality of service provider is a slice service load provider. The slice service load provider controls writes and is associated with a slice service rate bucket for a slice service object. The slice service load provider implements write throttling based upon various thresholds for slice service load of the slice service. Slice service load represents a fullness in percent of a cache on a node, which is a maximum value of cache data, cache metadata, etc. The slice service load provider uses a maximum for the slice service load information for both a primary slice service and a secondary slice service to check for a throttle threshold indicating resource saturation of the slice service(s). The slice service load provider utilizes a cSSLoadProviderMaintainThreshold (default: 65) to keep the write-throttle to maintain the last observed used write credits per second or cSSLoadProviderFixedLinearReductionStartingCredits (default: 10 MB/s) whichever is greater. The slice service load provider utilizes a cSSLoadProviderPercentageReductionThreshold (default: 75) to keep the write-throttle such that the slice service load provider reduces the last observed used write credits per second by percentage such as cSSLoadProviderPercentageReduction (default: 85) or cSSLoadProviderFixedLinearReductionStartingCredits (default: 10 MB/s) whichever is greater. The slice service load provider utilizes a cSSLoadProviderFixedLinearReductionThreshold (default: 85) that keeps the write-throttle for a reduction linearly down from cSSLoadProviderFixedLinearReductionStartingCredits (default: 10 MB/s). The slice service load provider utilizes a cSSLoadProviderReadOnlyThreshold (default: 95) that will not allow any writes, such as by setting a write credits allowed to 0.

In some embodiments, a slice service manages slices (slice files) used as indirection layers for accessing data on disk. A block service manages block storage of the data on disk. The slice service may be implemented as a metadata control plane and the block service may be implemented as a data control plane of storage management service (SMS) layer. Because the SMS layer may be implemented as a distributed component, the slice service and the block service may communicate with one another on a node and/or may communicate (e.g., through remote procedure calls) with other instances of the slice service and the block service hosted at other nodes within a distributed storage system.

In some embodiments of the slice service, the slice service may utilize slices, such as slice files, as indirection layers. The node may provide a client with access to a LUN or volume through the DMS layer. The LUN may have N logical blocks that may be 7 kb each. If one of the logical blocks is in use and storing data, then the logical block has a block identifier of a block storing the actual data. A slice file for the LUN (or volume) has mappings that map logical block numbers of the LUN (or volume) to block identifiers of the blocks storing the actual data. Each LUN or volume will have a slice file, so there may be hundreds of slices files that may be distributed amongst the nodes of the distributed cluster of nodes. A slice file may be replicated so that there is a primary slice file and one or more secondary slice files that are maintained as copies of the primary slice file. When write operations and delete operations are executed, corresponding mappings that are affected by these operations are updated within the primary slice file. The updates to the primary slice file are replicated to the one or more secondary slice files. After, the write or deletion operations are responded back to a client as successful. Also, read operations may be served from the primary slice since the primary slice may be the authoritative source of logical block to block identifier mappings. In some embodiments, the slice service may transmit I/O operations through the persistence abstraction layer to a slice volume hosted by a storage manager for the slice service. In this way, slice files and/or metadata may be stored within the slice volume exposed to the slice service by the storage manager. A quality of service provider is implemented for the slice service based upon load of the slice service.

In some embodiments, another type of quality of service provider is a file system service CPU provider. The file system service CPU provider may not separately control read and write credits, but controls total credits associated with a file system service D-blade rate bucket. For every QoSFireflyCPUStatsIntervalMsecs (default: 5 s), the file system service CPU provider computes a CPU load utilization (0-100%) and tracks the total 10 bytes used per-second in the same time interval. When the CPU load exceeds QoSFireflyCPUHighPercent (default: 98), the file system service CPU provider sets the total credits for throttle such that it maintains, but does not exceed, a desired CPU high percent. When the CPU load drops below QoSFireflyCPUNormalPercent (default: 88), the file system service CPU provider sets the total credits as unlimited to remove the throttle.

In some embodiments, a quality of service controller is hosted within each file system service/node. The quality of service controller runs every QoSControllerCreditRefreshInterval (default: 5 ms). The quality of service controller has rate buckets for volumes, slice services, and a local file system service (D-blade). The rate buckets are created and maintained during a configuration event such as a volume create event, a volume quality of service policy modification event, a file system service boot up event, etc. The quality of service controller provides functions that are invoked in-latency path to interact with quality of service to check whether I/O operations can proceed or should be queued by invoking CanAdmitRead( )/CanAdmitWrite( ) functions. When an operation can proceed, UseCreditsForRead( )/UseCreditsForWrite( ) functions are invoked to consume/deduct credits. For every credit refresh interval (e.g., 5 ms), the quality of service controller calls a rate bucket function that updates the rate bucket available credits for that interval (e.g., available credits for a 5 ms interval). Every second (or some other timespan), the quality of service controller calls a rate bucket function that updates a per-second credits target by consulting with quality of service providers associated with the quality of service provider and rate bucket. The quality of service controller has an operations queue such that when an operation cannot proceed, the operation is queued into the operations queue.

In some embodiments, the operations queue internally implements a high priority band queue, a medium priority band queue, and a low priority band queue. When there is a resource saturation situation, I/O operations for an object are queued into a corresponding priority band queue based upon a priority band of the object. Each queue provides functions to push an item, pop an item for re-evaluation, and pop an item if timed out. The operations queue has a biased select which selects a particular queue to dequeue items using weights assigned to the priority bands/priority band queues. Weights for the high priority band and the medium priority band are adjusted dynamically every second (or some other timespan) depending on how many active objects (volumes) each priority band had in the last second (or other timespan).

In some embodiments of weighting the priority band queues, a quality of service policy may be limiting 10,000 operations per second for a node based upon CPU throttling, and there may be 10 volumes in the node. A quality of service configured priority band ratio of processing queued I/O operation may be 4× for the high priority band queue, 2× for the medium priority band queue, and 1× for the low priority band queue. During a first scenario, there may be 5 volumes assigned to the high priority band, 3 volumes assigned to the medium priority band, and 2 volumes assigned to the low priority band. A total weight is calculated as 5*4+3*2+2*1=28. For 5 active high priority band volumes: 20/28*10000~7142 op/s, per-vol ~1428/s. For 3 active medium priority band volumes: 6/28*10000~2142 op/s, per-vol ~714/s. For 2 active low priority band volumes: 2/28*10000~714, per-vol ~357/s. In this way, weights, priority bands, and numbers of volumes assigned to the priority bands are used to determine IOPS per second for the different priority band volumes. During a second scenario, there may be 5 volumes assigned to the high priority band and 5 volumes assigned to the low priority band. A total weight is calculated as 5*4+5*1=25. For 5 active high priority band volumes=20/25*10000~8000 op/s, per-vol ~1600/s. For 5 active low priority band volumes=5/25*10000~2000 op/s, per-vol ~400/s. In this way, weights, priority bands, and numbers of volumes assigned to the priority bands are used to determine IOPS per second for the different priority band volumes. During a third scenario, there may be 5 volumes assigned to the high priority band and 5 volumes assigned to the medium priority band. A total weight is calculated as 5*4+5*2=25. For 5 active high priority band volumes=20/30*10000~6666 op/s, per-vol ~1333/s. For 5 active medium priority band volumes=10/30*10000~3333 op/s, per-vol ~667/s. In this way, weights, priority bands, and numbers of volumes assigned to the priority bands are used to determine IOPS per second for the different priority band volumes.

Figure 5:
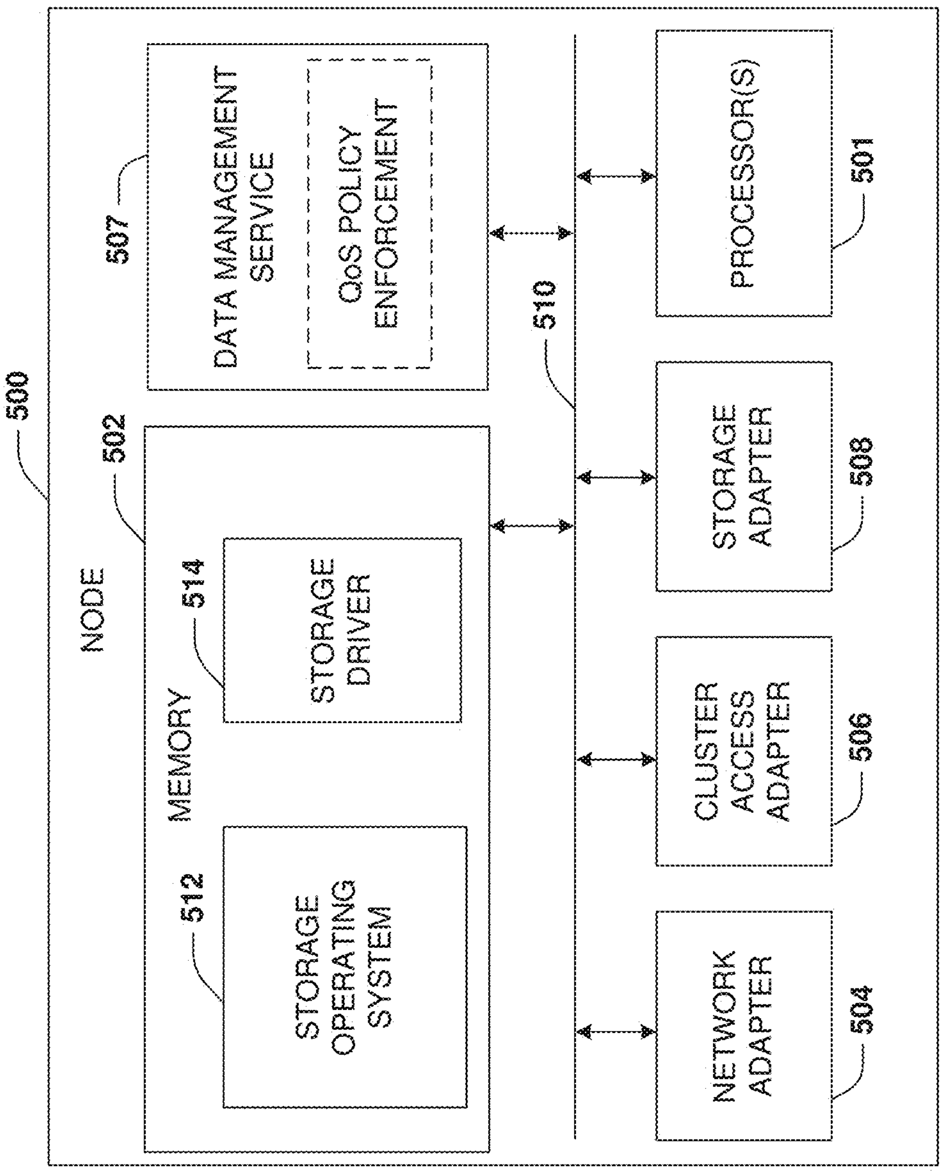
FIG. 5 is a block diagram illustrating an example of a node in accordance with an embodiment of the present technology.

FIG. 5 is a block diagram illustrating an example of a node in accordance with various embodiments of the present technology.

Referring to FIG. 5, a node 500 in this particular example includes processor(s) 501, a memory 502, a network adapter 504, a cluster access adapter 506, and a storage adapter 508 interconnected by a system bus 510. In other examples, the node 500 comprises a virtual machine, such as a virtual storage machine.

The node 500 also includes a storage operating system 512 installed in the memory 502 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc.

The network adapter 504 in this example includes the mechanical, electrical and signaling circuitry needed to connect the node 500 to one or more of the client devices over network connections, which may comprise, among other things, a point-to-point connection or a shared medium, such as a local area network. In some examples, the network adapter 504 further communicates (e.g., using TCP/IP) via a cluster fabric and/or another network (e.g., a WAN) (not shown) with storage devices of a distributed storage system to process storage operations associated with data stored thereon.

The storage adapter 508 cooperates with the storage operating system 512 executing on the node 500 to access information requested by one of the client devices (e.g., to access data on a data storage device managed by a network storage controller). The information may be stored on any type of attached array of writeable media such as magnetic disk drives, flash memory, and/or any other similar media adapted to store information.

In the exemplary data storage devices, information can be stored in data blocks on disks. The storage adapter 508 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 508 and, if necessary, processed by the processor(s) 501 (or the storage adapter 508 itself) prior to being forwarded over the system bus 510 to the network adapter 504 (and/or the cluster access adapter 506 if sending to another node computing device in the cluster) where the information is formatted into a data packet and returned to a requesting one of the client devices and/or sent to another node computing device attached via a cluster fabric. In some examples, a storage driver 514 in the memory 502 interfaces with the storage adapter to facilitate interactions with the data storage devices.

The storage operating system 512 can also manage communications for the node 500 among other devices that may be in a clustered network, such as attached to the cluster fabric. Thus, the node 500 can respond to client device requests to manage data on one of the data storage devices or storage devices of the distributed storage system in accordance with the client device requests.

A file system module of the storage operating system 512 can establish and manage one or more file systems including software code and data structures that implement a persistent hierarchical namespace of files and directories, for example. As an example, when a new data storage device (not shown) is added to a clustered network system, the file system module is informed where, in an existing directory tree, new files associated with the new data storage device are to be stored. This is often referred to as "mounting" a file system.

In the example node 500, memory 502 can include storage locations that are addressable by the processor(s) 501 and adapters 504, 506, and 508 for storing related software application code and data structures. The processor(s) 501 and adapters 504, 506, and 508 may, for example, include processing elements and/or logic circuitry configured to execute the software code and manipulate the data structures.

The storage operating system 512, portions of which are typically resident in the memory 502 and executed by the processor(s) 501, invokes storage operations in support of a file service implemented by the node 500. Other processing and memory mechanisms, including various computer readable media, may be used for storing and/or executing application instructions pertaining to the techniques described and illustrated herein. For example, the storage operating system 512 can also utilize one or more control files (not shown) to aid in the provisioning of virtual machines.

In some embodiments, the node 500 comprises a data management service (DMS) 507 configured to implement the techniques described herein such as quality of service policy enforcement (e.g., resource saturation based quality of service policy enforcement).

The examples of the technology described and illustrated herein may be embodied as one or more non-transitory computer or machine readable media, such as the memory 502, having machine or processor-executable instructions stored thereon for one or more aspects of the present technology, which when executed by processor(s), such as processor(s) 501, cause the processor(s) to carry out the steps necessary to implement the methods of this technology, as described and illustrated with the examples herein. In some examples, the executable instructions are configured to perform one or more steps of a method described and illustrated later.

Figure 6:
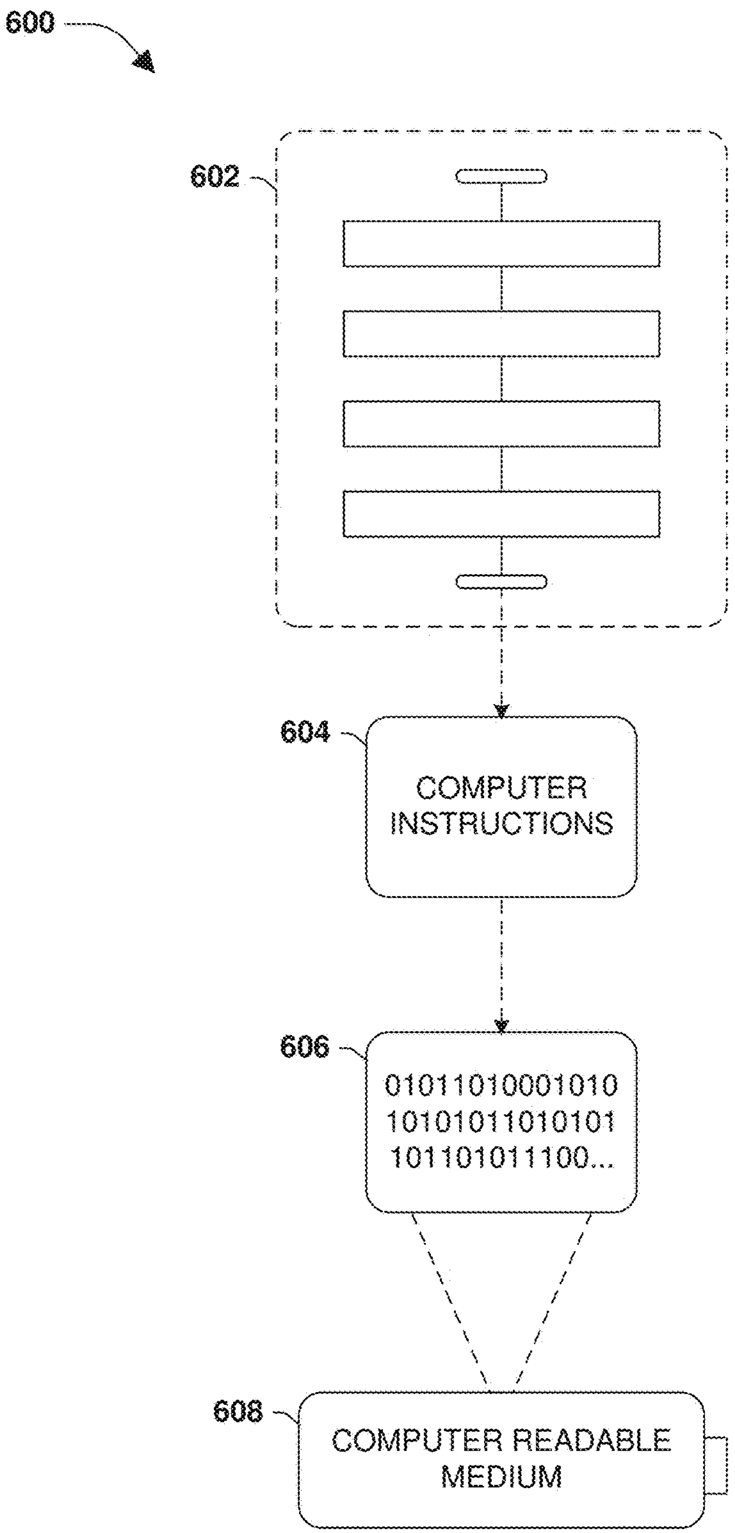
FIG. 6 is an example of a computer readable medium in which various embodiments of the present technology may be implemented.

FIG. 6 is an example of a computer readable medium 600 in which various embodiments of the present technology may be implemented. An example embodiment of a computer-readable medium or a computer-readable device that is devised in these ways is illustrated in FIG. 6, wherein the implementation comprises a computer-readable medium 608, such as a compact disc-recordable (CD-R), a digital versatile disc-recordable (DVD-R), flash drive, a platter of a hard disk drive, etc., on which is encoded computer-readable data 606. This computer-readable data 606, such as binary data comprising at least one of a zero or a one, in turn comprises processor-executable computer instructions 604 configured to operate according to one or more of the principles set forth herein. In some embodiments, the processor-executable computer instructions 604 are configured to perform at least some of the exemplary methods 602 disclosed herein, such as method 200 of FIG. 2, for example. In some embodiments, the processor-executable computer instructions 604 are configured to implement a system, such as at least some of the exemplary systems disclosed herein, such as system 100 of FIGS. 1A-1D, system 300 of FIG. 3, and/or system 400 of FIG. 4A, for example. Many such computer-readable media are contemplated to operate in accordance with the techniques presented herein.

In some embodiments, the described methods and/or their equivalents may be implemented with computer executable instructions. Thus, in some embodiments, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In some embodiments, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, magnetic tape, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:

maintaining a queue, for each priority band specified by a resource saturation based quality of service policy, used to queue I/O operations targeting volumes of a distributed storage system implementing the resource saturation based quality of service policy, where each priority band specifies a different level of service to provide to the volumes of the distributed storage system;

assigning weights to each queue based upon the priority bands, wherein a first weight is assigned to a first queue based upon the first queue being maintained for a first priority band, a second weight is assigned to a second queue based upon the second queue being maintained for a second priority band, and a third weight is assigned to a third queue based upon the third queue being maintained for a third priority band;

queuing an I/O operation into at least one of the first queue, the second queue, or the third queue as a queued I/O operation based upon resource saturation monitored using the resource saturation based quality of service policy; and utilizing the weights to select the queued I/O operation to dequeue and reevaluate for execution utilizing current resource saturation monitored using the resource saturation based quality of service policy.

2. The method of claim 1, comprising:

for each priority band, determining a count of volumes assigned to a priority band; and inputting the weights and the counts of volumes into a probability function to select the queued I/O operation.

3. The method of claim 1, comprising:

utilizing the resource saturation based quality of service policy to dynamically set a throughput ceiling limit for the volume to throttle and shape I/O operations.

4. The method of claim 1, comprising:

for each priority band, determining a count of volumes assigned to a priority band; and inputting the weights and the counts of volumes into a random number generator to select the queued I/O operation.

5. The method of claim 1, comprising:

modifying the resource saturation based quality of service policy based upon I/O statistics of a storage operating system hosted by the distributed storage system.

6. The method of claim 1, comprising:

performing write throttling upon incoming I/O operations directed to a cache of the distributed storage system using the resource saturation based quality of service policy to protect distributed backend storage of the distributed storage system from being overloaded.

7. The method of claim 1, comprising:

configuring a quality of service priority scheduler to schedule I/O operations directed to a first volume according to a first proportion corresponding to the first priority band and schedule I/O operations directed to a second volume according to a second proportion based upon the second volume corresponding to the second priority band.

8. The method of claim 7, comprising:

configuring the quality of service priority scheduler to schedule I/O operations directed to a third volume according to a third proportion based upon the third volume corresponding to the third priority band.

9. A non-transitory machine readable medium comprising instructions, which when executed by a machine, causes the machine to:

maintain a queue, for each priority band specified by a resource saturation based quality of service policy, used to queue I/O operations targeting volumes of a distributed storage system implementing the resource saturation based quality of service policy, where each priority band specifies a different level of service to provide to the volumes of the distributed storage system;

assign eights to each queue based upon the priority bands, wherein a first weight is assigned to a first queue based upon the first queue being maintained for a first priority band, a second weight is assigned to a second queue based upon the second queue being maintained for a second priority band, and a third weight is assigned to a third queue based upon the third queue being maintained for a third priority band;

queue an I/O operation into at least one of the first queue, the second queue, or the third queue as a queued I/O operation based upon resource saturation monitored using the resource saturation based quality of service policy; and utilize the weights to select the queued I/O operation to dequeue and reevaluate for execution utilizing current resource saturation monitored using the resource saturation based quality of service policy.

10. The non-transitory machine readable medium of claim 9, wherein the instructions further cause the machine to:

determine whether a credit pool comprises available credits to allocate to the I/O operation for execution, wherein credits within the credit pool are allocated based upon resource utilization.

11. The non-transitory machine readable medium of claim 9, wherein the instructions further cause the machine to:

in response to utilization of a resource exceeding a threshold, routing the I/O operation to a file system of the distributed storage system for execution.

12. The non-transitory machine readable medium of claim 9, wherein the instructions further cause the machine to:

utilize an I/O processing rate recommendation for I/O throttling of I/O operations to either route the I/O operations to a file system of the distributed storage system for execution or queue the I/O operations.

13. The non-transitory machine readable medium of claim 9, wherein the instructions further cause the machine to:

enforce, as part of processing the queue, a node resource saturation point based upon processor load of the distributed storage system.

14. The non-transitory machine readable medium of claim 9, wherein the instructions further cause the machine to:

determine whether to queue the I/O operations based upon round trip operation completion statistics.

15. A computing device, of a distributed storage system, comprising:

a memory comprising machine executable code; and a processor coupled to the memory, the processor configured to execute the machine executable code to cause the computing device to:

maintain a queue, for each priority band specified by a resource saturation based quality of service policy, used to queue I/O operations targeting volumes of a distributed storage system implementing the resource saturation based quality of service policy, where each priority band specifies a different level of service to provide to the volumes of the distributed storage system;

assign weights to each queue based upon the priority bands, wherein a first weight is assigned to a first queue based upon the first queue being maintained for a first priority band, a second weight is assigned to a second queue based upon the second queue being maintained for a second priority band, and a third weight is assigned to a third queue based upon the third queue being maintained for a third priority band;

queue an I/O operation into the first queue or the second queue based upon resource saturation monitored using the resource saturation based quality of service policy; and utilize the weights to select the queued I/O operation to dequeue and reevaluate for execution utilizing current resource saturation monitored using the resource saturation based quality of service policy.

16. The computing device of claim 15, wherein the machine executable code causes the computing device to:

dispatch a queued I/O operation to a file system of the distributed storage system or aborts the queued I/O operation based upon the queued I/O operation pending in the first queue or the second queue for greater than a threshold timespan.

17. The computing device of claim 15, wherein the machine executable code causes the computing device to:

modify the resource saturation based quality of service policy based upon I/O statistics of a storage operating system hosted by the distributed storage system.

18. The computing device of claim 15, wherein the machine executable code causes the computing device to:

perform write throttling upon incoming I/O operations directed to a cache of the distributed storage system using the resource saturation based quality of service policy to protect distributed backend storage of the distributed storage system from being overloaded.

19. The computing device of claim 15, wherein the machine executable code causes the computing device to:

configure a quality of service priority scheduler to schedule I/O operations directed to a first volume according to a first proportion corresponding to the first priority band and schedule I/O operations directed to a second volume according to a second proportion based upon the second volume corresponding to the second priority band.

20. The computing device of claim 19, wherein the machine executable code causes the computing device to:

configure the quality of service priority scheduler to schedule I/O operations directed to a third volume according to a third proportion based upon the third volume corresponding to the third priority band.

* * * * *